United States Patent
Kim et al.

(10) Patent No.: US 12,323,892 B2
(45) Date of Patent: Jun. 3, 2025

(54) METHOD AND APPARATUS FOR TRANSMITTING ASSISTANT INFORMATION FOR A QUICK SWITCH BETWEEN BROADCAST AND UNICAST TRANSMISSION IN A WIRELESS COMMUNICATION SYSTEM

(71) Applicant: LG ELECTRONICS INC., Seoul (KR)

(72) Inventors: Sangwon Kim, Seoul (KR); Sunghoon Jung, Seoul (KR); Daewook Byun, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 351 days.

(21) Appl. No.: 17/758,429

(22) PCT Filed: Jan. 18, 2021

(86) PCT No.: PCT/KR2021/000675
§ 371 (c)(1),
(2) Date: Jul. 6, 2022

(87) PCT Pub. No.: WO2021/149986
PCT Pub. Date: Jul. 29, 2021

(65) Prior Publication Data
US 2023/0030347 A1    Feb. 2, 2023

(30) Foreign Application Priority Data
Jan. 22, 2020   (KR) ........................ 10-2020-0008907

(51) Int. Cl.
*H04W 4/50*   (2018.01)
*H04W 4/06*   (2009.01)
(Continued)

(52) U.S. Cl.
CPC ............... *H04W 4/50* (2018.02); *H04W 4/06* (2013.01); *H04W 4/20* (2013.01); *H04W 72/30* (2023.01)

(58) Field of Classification Search
CPC ......... H04W 4/50; H04W 72/30; H04W 4/06; H04W 4/20
(Continued)

(56) References Cited

U.S. PATENT DOCUMENTS 7,664,070 B2 *  2/2010  Van Dervelde ....... H04W 72/30
                                                    370/335
8,578,432 B2    11/2013  Vasudevan et al.
(Continued)

FOREIGN PATENT DOCUMENTS

KR      2015-0037907         4/2015

OTHER PUBLICATIONS

PCT International Application No. PCT/KR2021/000675, International Search Report dated Apr. 19, 2021, 2 pages.
(Continued)

*Primary Examiner* — Zhen Y Wu
(74) *Attorney, Agent, or Firm* — LEE, HONG, DEGERMAN, KANG & WAIMEY

(57) ABSTRACT

A method and apparatus for transmitting assistant information for a quick switch between broadcast and unicast transmission in a wireless communication system is provided. A wireless device receives, from a network, a service via unicast. A wireless device detects reception of the service via multicast and/or broadcast while receiving the service via unicast. A wireless device informs the network of the reception of the service via the multicast and/or the broadcast.

18 Claims, 17 Drawing Sheets

(51) Int. Cl.
*H04W 4/20* (2018.01)
*H04W 72/30* (2023.01)

(58) Field of Classification Search
USPC .......................................................... 340/7.21
See application file for complete search history.

(56) References Cited

U.S. PATENT DOCUMENTS

| | | | | |
|---|---|---|---|---|
| 8,819,264 | B2* | 8/2014 | Rodrigues | H04W 28/0215 709/231 |
| 9,887,852 | B2 | 2/2018 | Oyman | |
| 10,374,818 | B2* | 8/2019 | Rodrigues | H04W 76/40 |
| 2005/0237972 | A1* | 10/2005 | Van Dervelde | H04W 72/30 370/341 |
| 2013/0024582 | A1* | 1/2013 | Rodrigues | H04W 72/30 709/231 |
| 2013/0121133 | A1* | 5/2013 | Anchan | H04W 4/06 370/216 |
| 2013/0194999 | A1* | 8/2013 | Anchan | H04W 52/0219 370/312 |
| 2014/0177504 | A1* | 6/2014 | Sayeed | H04W 72/30 370/312 |
| 2014/0328243 | A1* | 11/2014 | Etemad | H04L 1/1822 370/312 |
| 2014/0355493 | A1 | 12/2014 | Niu et al. | |
| 2014/0362694 | A1* | 12/2014 | Rodrigues | H04W 72/30 370/230 |
| 2015/0181610 | A1* | 6/2015 | Lee | H04L 5/0062 370/329 |
| 2015/0358374 | A1* | 12/2015 | Wei | H04L 65/80 370/329 |
| 2018/0132078 | A1* | 5/2018 | Chan | H04L 1/0003 |
| 2018/0176769 | A1* | 6/2018 | Gupta | H04W 8/245 |
| 2019/0174460 | A1* | 6/2019 | Zhang | H04W 72/30 |
| 2020/0084587 | A1* | 3/2020 | Lisewski | H04L 67/141 |
| 2021/0352443 | A1* | 11/2021 | Matolia | H04W 76/22 |
| 2023/0027425 | A1* | 1/2023 | Zhu | H04W 76/30 |

OTHER PUBLICATIONS

LG Electronics, "New MBS architecture and procedures," S2-2000350, SA WG2 Meeting #136AH, Jan. 2020, 14 pages.

Huawei et al., "Solution to KI1: Establishment of MBS session for multicast," S2-1911645, SA WG2 Meeting #136, Nov. 2019, 5 pages.

Samsung, "Solution for unicast-multicast delivery mode switch," S2-2000891, 3GPP SA WG2 Meeting #136-AH, Jan. 2020, 7 pages.

3rd Generation Partnership Project, "Technical Specification Group Radio Access Network; Evolved Universal Terrestrial Radio Access (E-UTRA); Radio Resource Control (RRC); Protocol specification (Release 15)," Section 5.8 of 3GPP TS 36.331 V15.7.0, Sep. 2019, 962 pages.

3rd Generation Partnership Project, "Technical Specification Group Radio Access Network; Evolved Universal Terrestrial Radio Access (E-UTRA); User Equipment (UE) procedures in idle mode (Release 15)," Section 6 of 3GPP TS 36.304 V15.4.0, Jun. 2019, 55 pages.

3rd Generation Partnership Project, "Technical Specification Group Radio Access Network; NR; NR and NG-RAN Overall Description; Stage 2 (Release 15)," Section 5.1 of 3GPP TS 38.300 V15.7.0, Sep. 2019, 99 pages.

3rd Generation Partnership Project, "Technical Specification Group Radio Access Network; NR; Physical channels and modulation (Release 15)," Section 4.4.5 of 3GPP TS 38.211 V15.7.0, Sep. 2019, 97 pages.

* cited by examiner

FIG. 11
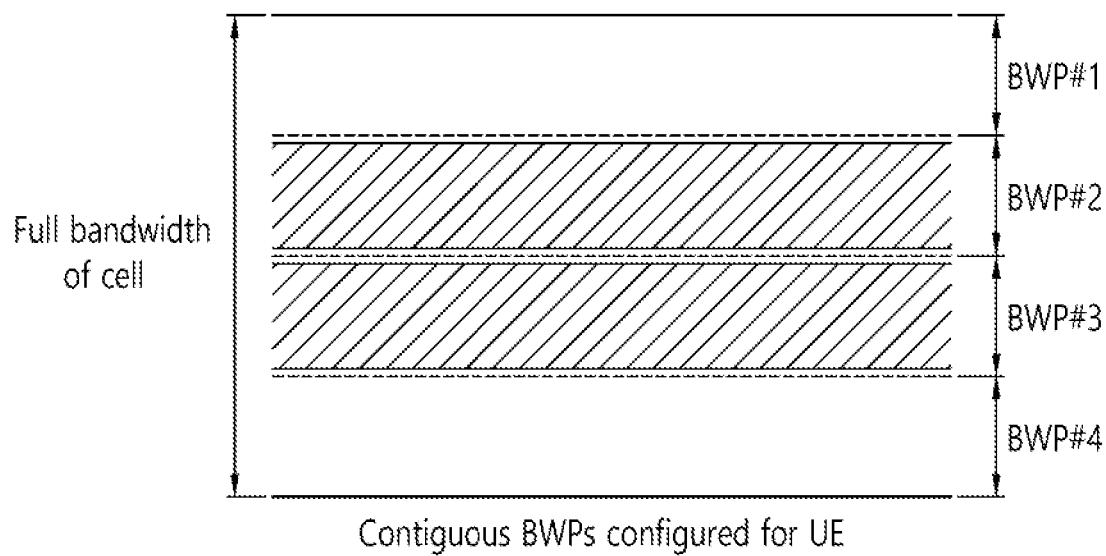
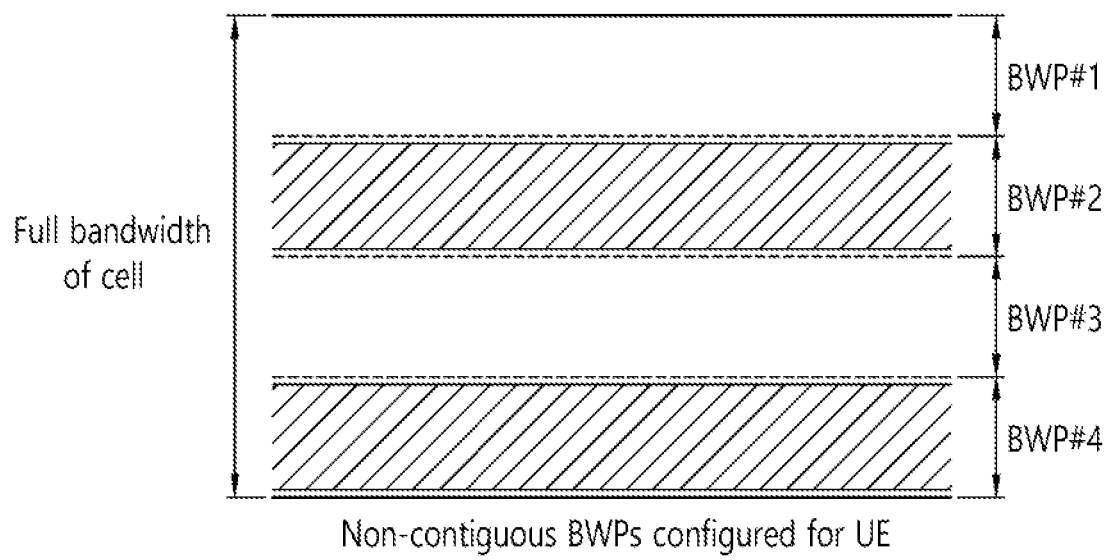

METHOD AND APPARATUS FOR TRANSMITTING ASSISTANT INFORMATION FOR A QUICK SWITCH BETWEEN BROADCAST AND UNICAST TRANSMISSION IN A WIRELESS COMMUNICATION SYSTEM

CROSS-REFERENCE TO RELATED APPLICATIONS

This application is the National Stage filing under 35 U.S.C. 371 of International Application No. PCT/KR2021/000675, filed on Jan. 18, 2021, which claims the benefit of earlier filing date and right of priority to Korean Application No. 10-2020-0008907, filed on Jan. 22, 2020, the contents of which are all hereby incorporated by reference herein in their entireties.

BACKGROUND

Technical Field

The present disclosure relates to a method and apparatus for transmitting assistant information for a quick switch between broadcast and unicast transmission in a wireless communication system.

Related Art

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in international telecommunication union (ITU) and 3GPP to develop requirements and specifications for new radio (NR) systems. 3GPP has to identify and develop the technology components needed for successfully standardizing the new RAT timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

NR is a technology that operates on a very wideband compared with LTE. In order to support flexible broadband operation, NR has the following design principles different from LTE in terms of broadband support.

The ability of the network and the user equipment (UE) to support the bandwidth may be different.

The bandwidth capabilities of the downlink and uplink supported by the UE may be different.

The capabilities of the bandwidths supported by each UE may differ, so that UEs supporting different bandwidths may coexist within one network frequency band.

In order to reduce the power consumption of the UE, the UE may be configured with different bandwidth depending on the traffic load state of the UE, etc.

In order to satisfy the above-mentioned design principles, NR newly introduced a concept of bandwidth part (BWP) in addition to carrier aggregation (CA) of existing LTE.

SUMMARY

Technical Objects

The transmission mode may need to be switched quickly between the unicast and broadcast/multicast depending on the number of users for efficient management of the radio resource.

For example, if the number of wireless devices that want to receive a service is lower than a threshold, the network could provide the service to each UE in unicast manner. For other example, if the number of wireless devices that want to receive another service is higher than a threshold, network may broadcast the other service to reduce the radio resource required to provide the other service.

If the number of user who wants to receive a certain service increases and becomes higher than a threshold, the network would initiate the broadcast for the service. In this case, the network may need to maintain the unicast transmission of the service for a while after the broadcast of the service is started, because the unicast transmission should not be terminated before the UE successfully receives the service in broadcast manner.

However, the network does not know when the UE succeeds in receiving the broadcast. The network may need to perform the unicast transmission and broadcast for the service in parallel for a sufficiently long period of time. It may cause huge waste of radio resource.

Therefore, studies for transmitting assistant information for a quick switch between broadcast and unicast transmission in a wireless communication system are required.

Technical Solutions

In an aspect, a method performed by a wireless device in a wireless communication system is provided. A wireless device receives, from a network, a service via unicast. A wireless device detects reception of the service via multicast and/or broadcast while receiving the service via unicast. A wireless device informs the network of the reception of the service via the multicast and/or the broadcast.

In another aspect, an apparatus for implementing the above method is provided.

Technical Effects

The present disclosure can have various advantageous effects.

According to some embodiments of the present disclosure, a wireless device could perform a quick switch between broadcast and unicast transmission efficiently, by informing a network of successful reception of a service via broadcast.

According to some embodiments of the present disclosure, a wireless communication system could efficiently provide a method for a quick switch between broadcast and unicast transmission, by using assistant information from a wireless device.

For example, when a transmission mode for a service is switched from the unicast to the broadcast, network could minimize the period of time that the network need to perform the unicast transmission in parallel with the broadcast for the service.

For example, the network could reduce the radio resource which gets wasted for the unicast transmission.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

BRIEF DESCRIPTION OF THE DRAWINGS

FIG. 11 shows an example of contiguous BWPs and non-contiguous BWPs to which implementations of the present disclosure is applied

DETAILED DESCRIPTION

Figure 1:
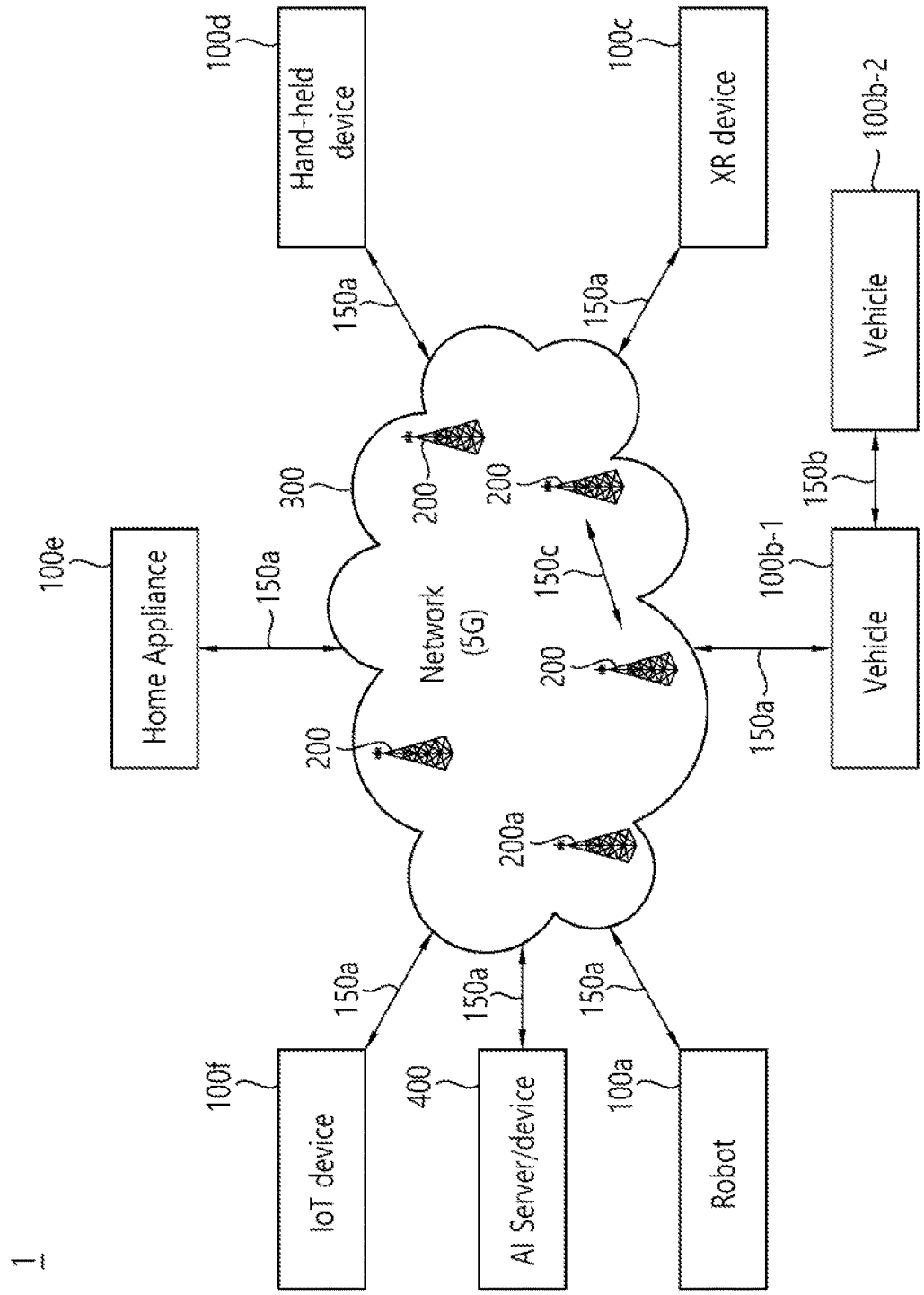
FIG. 1 shows an example of a communication system to which implementations of the present disclosure is applied.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. LTE-advanced (LTE-A) is an evolved version of 3GPP LTE.

For convenience of description, implementations of the present disclosure are mainly described in regards to a 3GPP based wireless communication system. However, the technical features of the present disclosure are not limited thereto. For example, although the following detailed description is given based on a mobile communication system corresponding to a 3GPP based wireless communication system, aspects of the present disclosure that are not limited to 3GPP based wireless communication system are applicable to other mobile communication systems.

For terms and technologies which are not specifically described among the terms of and technologies employed in the present disclosure, the wireless communication standard documents published before the present disclosure may be referenced.

In the present disclosure, "A or B" may mean "only A", "only B", or "both A and B". In other words, "A or B" in the present disclosure may be interpreted as "A and/or B". For example, "A, B or C" in the present disclosure may mean "only A", "only B", "only C", or "any combination of A, B and C".

In the present disclosure, slash (/) or comma (,) may mean "and/or". For example, "A/B" may mean "A and/or B". Accordingly, "A/B" may mean "only A", "only B", or "both A and B". For example, "A, B, C" may mean "A, B or C".

In the present disclosure, "at least one of A and B" may mean "only A", "only B" or "both A and B". In addition, the expression "at least one of A or B" or "at least one of A and/or B" in the present disclosure may be interpreted as same as "at least one of A and B".

In addition, in the present disclosure, "at least one of A, B and C" may mean "only A", "only B", "only C", or "any combination of A, B and C". In addition, "at least one of A, B or C" or "at least one of A, B and/or C" may mean "at least one of A, B and C".

Also, parentheses used in the present disclosure may mean "for example". In detail, when it is shown as "control information (PDCCH)", "PDCCH" may be proposed as an example of "control information". In other words, "control information" in the present disclosure is not limited to "PDCCH", and "PDCCH" may be proposed as an example of "control information". In addition, even when shown as "control information (i.e., PDCCH)", "PDCCH" may be proposed as an example of "control information".

Technical features that are separately described in one drawing in the present disclosure may be implemented separately or simultaneously.

Although not limited thereto, various descriptions, functions, procedures, suggestions, methods and/or operational flowcharts of the present disclosure disclosed herein can be applied to various fields requiring wireless communication and/or connection (e.g., 5G) between devices.

Hereinafter, the present disclosure will be described in more detail with reference to drawings. The same reference numerals in the following drawings and/or descriptions may refer to the same and/or corresponding hardware blocks, software blocks, and/or functional blocks unless otherwise indicated.

FIG. 1 shows an example of a communication system to which implementations of the present disclosure is applied.

The 5G usage scenarios shown in FIG. 1 are only exemplary, and the technical features of the present disclosure can be applied to other 5G usage scenarios which are not shown in FIG. 1.

Three main requirement categories for 5G include (1) a category of enhanced mobile broadband (eMBB), (2) a category of massive machine type communication (mMTC), and (3) a category of ultra-reliable and low latency communications (URLLC).

Partial use cases may require a plurality of categories for optimization and other use cases may focus only upon one key performance indicator (KPI). 5G supports such various use cases using a flexible and reliable method.

eMBB far surpasses basic mobile Internet access and covers abundant bidirectional work and media and entertainment applications in cloud and augmented reality. Data is one of 5G core motive forces and, in a 5G era, a dedicated voice service may not be provided for the first time. In 5G, it is expected that voice will be simply processed as an application program using data connection provided by a communication system. Main causes for increased traffic volume are due to an increase in the size of content and an increase in the number of applications requiring high data transmission rate. A streaming service (of audio and video), conversational video, and mobile Internet access will be more widely used as more devices are connected to the Internet. These many application programs require connectivity of an always turned-on state in order to push real-time information and alarm for users. Cloud storage and applications are rapidly increasing in a mobile communication platform and may be applied to both work and entertainment. The cloud storage is a special use case which accelerates growth of uplink data transmission rate. 5G is also used for remote work of cloud. When a tactile interface is used, 5G demands much lower end-to-end latency to maintain user good experience. Entertainment, for example, cloud gaming and video streaming, is another core element which increases demand for mobile broadband capability. Entertainment is essential for a smartphone and a tablet in any place including high mobility environments such as a train, a vehicle, and an airplane. Other use cases are augmented reality for entertainment and information search. In this case, the augmented reality requires very low latency and instantaneous data volume.

In addition, one of the most expected 5G use cases relates a function capable of smoothly connecting embedded sensors in all fields, i.e., mMTC. It is expected that the number of potential Internet-of-things (IoT) devices will reach 204 hundred million up to the year of 2020. An industrial IoT is one of categories of performing a main role enabling a smart city, asset tracking, smart utility, agriculture, and security infrastructure through 5G.

URLLC includes a new service that will change industry through remote control of main infrastructure and an ultra-reliable/available low-latency link such as a self-driving vehicle. A level of reliability and latency is essential to control a smart grid, automatize industry, achieve robotics, and control and adjust a drone.

5G is a means of providing streaming evaluated as a few hundred megabits per second to gigabits per second and may complement fiber-to-the-home (FTTH) and cable-based broadband (or DOCSIS). Such fast speed is needed to deliver TV in resolution of 4K or more (6K, 8K, and more), as well as virtual reality and augmented reality. Virtual reality (VR) and augmented reality (AR) applications include almost immersive sports games. A specific application program may require a special network configuration. For example, for VR games, gaming companies need to incorporate a core server into an edge network server of a network operator in order to minimize latency.

Automotive is expected to be a new important motivated force in 5G together with many use cases for mobile communication for vehicles. For example, entertainment for passengers requires high simultaneous capacity and mobile broadband with high mobility. This is because future users continue to expect connection of high quality regardless of their locations and speeds. Another use case of an automotive field is an AR dashboard. The AR dashboard causes a driver to identify an object in the dark in addition to an object seen from a front window and displays a distance from the object and a movement of the object by overlapping information talking to the driver. In the future, a wireless module enables communication between vehicles, information exchange between a vehicle and supporting infrastructure, and information exchange between a vehicle and other connected devices (e.g., devices accompanied by a pedestrian). A safety system guides alternative courses of a behavior so that a driver may drive more safely drive, thereby lowering the danger of an accident. The next stage will be a remotely controlled or self-driven vehicle. This requires very high reliability and very fast communication between different self-driven vehicles and between a vehicle and infrastructure. In the future, a self-driven vehicle will perform all driving activities and a driver will focus only upon abnormal traffic that the vehicle cannot identify. Technical requirements of a self-driven vehicle demand ultra-low latency and ultra-high reliability so that traffic safety is increased to a level that cannot be achieved by human being.

A smart city and a smart home/building mentioned as a smart society will be embedded in a high-density wireless sensor network. A distributed network of an intelligent sensor will identify conditions for costs and energy-efficient maintenance of a city or a home. Similar configurations may be performed for respective households. All of temperature sensors, window and heating controllers, burglar alarms, and home appliances are wirelessly connected. Many of these sensors are typically low in data transmission rate, power, and cost. However, real-time HD video may be demanded by a specific type of device to perform monitoring.

Consumption and distribution of energy including heat or gas is distributed at a higher level so that automated control of the distribution sensor network is demanded. The smart grid collects information and connects the sensors to each other using digital information and communication technology so as to act according to the collected information. Since this information may include behaviors of a supply company and a consumer, the smart grid may improve distribution of fuels such as electricity by a method having efficiency, reliability, economic feasibility, production sustainability, and automation. The smart grid may also be regarded as another sensor network having low latency.

Mission critical application (e.g., e-health) is one of 5G use scenarios. A health part contains many application programs capable of enjoying benefit of mobile communication. A communication system may support remote treatment that provides clinical treatment in a faraway place. Remote treatment may aid in reducing a barrier against distance and improve access to medical services that cannot be continuously available in a faraway rural area. Remote treatment is also used to perform important treatment and save lives in an emergency situation. The wireless sensor network based on mobile communication may provide remote monitoring and sensors for parameters such as heart rate and blood pressure.

Wireless and mobile communication gradually becomes important in the field of an industrial application. Wiring is high in installation and maintenance cost. Therefore, a possibility of replacing a cable with reconstructible wireless links is an attractive opportunity in many industrial fields. However, in order to achieve this replacement, it is necessary for wireless connection to be established with latency, reliability, and capacity similar to those of the cable and management of wireless connection needs to be simplified. Low latency and a very low error probability are new requirements when connection to 5G is needed.

Logistics and freight tracking are important use cases for mobile communication that enables inventory and package tracking anywhere using a location-based information system. The use cases of logistics and freight typically demand low data rate but require location information with a wide range and reliability.

Referring to FIG. 1, the communication system 1 includes wireless devices 100a to 100f, base stations (BSs) 200, and a network 300. Although FIG. 1 illustrates a 5G network as an example of the network of the communication system 1, the implementations of the present disclosure are not limited to the 5G system, and can be applied to the future communication system beyond the 5G system.

The BSs 200 and the network 300 may be implemented as wireless devices and a specific wireless device may operate as a BS/network node with respect to other wireless devices.

The wireless devices 100a to 100f represent devices performing communication using radio access technology (RAT) (e.g., 5G new RAT (NR)) or LTE) and may be referred to as communication/radio/5G devices. The wireless devices 100a to 100f may include, without being limited to, a robot 100a, vehicles 100b-1 and 100b-2, an extended reality (XR) device 100c, a hand-held device 100d, a home appliance 100e, an IoT device 100f, and an artificial intelligence (AI) device/server 400. For example, the vehicles may include a vehicle having a wireless communication function, an autonomous driving vehicle, and a vehicle capable of performing communication between vehicles. The vehicles may include an unmanned aerial vehicle (UAV) (e.g., a drone). The XR device may include an AR/VR/Mixed Reality (MR) device and may be implemented in the form of a head-mounted device (HMD), a head-up display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter.

In the present disclosure, the wireless devices 100a to 100f may be called user equipments (UEs). A UE may include, for example, a cellular phone, a smartphone, a laptop computer, a digital broadcast terminal, a personal digital assistant (PDA), a portable multimedia player (PMP), a navigation system, a slate personal computer (PC), a tablet PC, an ultrabook, a vehicle, a vehicle having an autonomous traveling function, a connected car, an UAV, an AI module, a robot, an AR device, a VR device, an MR device, a hologram device, a public safety device, an MTC device, an IoT device, a medical device, a FinTech device (or a financial device), a security device, a weather/environment device, a device related to a 5G service, or a device related to a fourth industrial revolution field.

The UAV may be, for example, an aircraft aviated by a wireless control signal without a human being onboard.

The VR device may include, for example, a device for implementing an object or a background of the virtual world. The AR device may include, for example, a device implemented by connecting an object or a background of the virtual world to an object or a background of the real world. The MR device may include, for example, a device implemented by merging an object or a background of the virtual world into an object or a background of the real world. The hologram device may include, for example, a device for implementing a stereoscopic image of 360 degrees by recording and reproducing stereoscopic information, using an interference phenomenon of light generated when two laser lights called holography meet.

The public safety device may include, for example, an image relay device or an image device that is wearable on the body of a user.

The MTC device and the IoT device may be, for example, devices that do not require direct human intervention or manipulation. For example, the MTC device and the IoT device may include smartmeters, vending machines, thermometers, smartbulbs, door locks, or various sensors.

The medical device may be, for example, a device used for the purpose of diagnosing, treating, relieving, curing, or preventing disease. For example, the medical device may be a device used for the purpose of diagnosing, treating, relieving, or correcting injury or impairment. For example, the medical device may be a device used for the purpose of inspecting, replacing, or modifying a structure or a function. For example, the medical device may be a device used for the purpose of adjusting pregnancy. For example, the medical device may include a device for treatment, a device for operation, a device for (in vitro) diagnosis, a hearing aid, or a device for procedure.

The security device may be, for example, a device installed to prevent a danger that may arise and to maintain safety. For example, the security device may be a camera, a closed-circuit TV (CCTV), a recorder, or a black box.

The FinTech device may be, for example, a device capable of providing a financial service such as mobile payment. For example, the FinTech device may include a payment device or a point of sales (POS) system.

The weather/environment device may include, for example, a device for monitoring or predicting a weather/environment.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, a 5G (e.g., NR) network, and a beyond-5G network. Although the wireless devices 100a to 100f may communicate with each other through the BSs 200/network 300, the wireless devices 100a to 100f may perform direct communication (e.g., sidelink communication) with each other without passing through the BSs 200/network 300. For example, the vehicles 100b-1 and 100b-2 may perform direct communication (e.g., vehicle-to-vehicle (V2V)/vehicle-to-everything (V2X) communication). The IoT device (e.g., a sensor) may perform direct communication with other IoT devices (e.g., sensors) or other wireless devices 100a to 100f.

Wireless communication/connections 150a, 150b and 150c may be established between the wireless devices 100a to 100f and/or between wireless device 100a to 100f and BS 200 and/or between BSs 200. Herein, the wireless communication/connections may be established through various RATs (e.g., 5G NR) such as uplink/downlink communication 150a, sidelink communication (or device-to-device (D2D) communication) 150b, inter-base station communication 150c (e.g., relay, integrated access and backhaul (IAB)), etc. The wireless devices 100a to 100f and the BSs 200/the wireless devices 100a to 100f may transmit/receive radio signals to/from each other through the wireless communication/connections 150a, 150b and 150c. For example, the wireless communication/connections 150a, 150b and 150c may transmit/receive signals through various physical channels. To this end, at least a part of various configuration information configuring processes, various signal processing processes (e.g., channel encoding/decoding, modulation/demodulation, and resource mapping/de-mapping), and resource allocating processes, for transmitting/receiving radio signals, may be performed based on the various proposals of the present disclosure.

Here, the radio communication technologies implemented in the wireless devices in the present disclosure may include narrowband internet-of-things (NB-IoT) technology for low-power communication as well as LTE, NR and 6G. For example, NB-IoT technology may be an example of low power wide area network (LPWAN) technology, may be implemented in specifications such as LTE Cat NB1 and/or LTE Cat NB2, and may not be limited to the above-mentioned names. Additionally and/or alternatively, the radio communication technologies implemented in the wireless devices in the present disclosure may communicate based on LTE-M technology. For example, LTE-M technology may be an example of LPWAN technology and be called by various names such as enhanced machine type communication (eMTC). For example, LTE-M technology may be implemented in at least one of the various specifications, such as 1) LTE Cat 0, 2) LTE Cat M1, 3) LTE Cat M2, 4) LTE non-bandwidth limited (non-BL), 5) LTE-MTC, 6) LTE Machine Type Communication, and/or 7) LTE M, and may not be limited to the above-mentioned names. Additionally and/or alternatively, the radio communication technologies implemented in the wireless devices in the present disclosure may include at least one of ZigBee, Bluetooth, and/or LPWAN which take into account low-power communication, and may not be limited to the above-mentioned names. For example, ZigBee technology may generate personal area networks (PANs) associated with small/low-power digital communication based on various specifications such as IEEE 802.15.4 and may be called various names.

Figure 2:
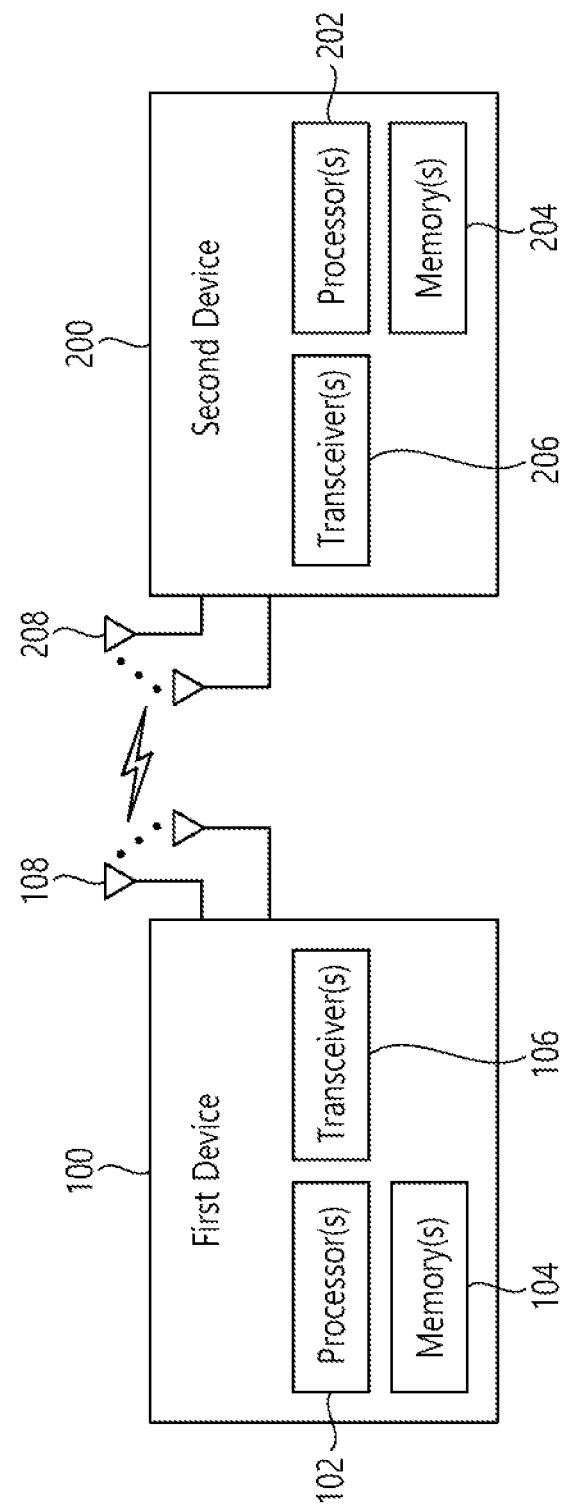
FIG. 2 shows an example of wireless devices to which implementations of the present disclosure is applied.

FIG. 2 shows an example of wireless devices to which implementations of the present disclosure is applied.

Referring to FIG. 2, a first wireless device 100 and a second wireless device 200 may transmit/receive radio signals to/from an external device through a variety of RATs (e.g., LTE and NR). In FIG. 2, {the first wireless device 100 and the second wireless device 200} may correspond to at least one of {the wireless device 100a to 100f and the BS 200}, {the wireless device 100a to 100f and the wireless device 100a to 100f} and/or {the BS 200 and the BS 200} of FIG. 1.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, suggestions, methods and/or operational flowcharts described in the present disclosure. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver(s) 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, suggestions, methods and/or operational flowcharts described in the present disclosure. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with radio frequency (RF) unit(s). In the present disclosure, the first wireless device 100 may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, suggestions, methods and/or operational flowcharts described in the present disclosure. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, suggestions, methods and/or operational flowcharts described in the present disclosure. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the second wireless device 200 may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as physical (PHY) layer, media access control (MAC) layer, radio link control (RLC) layer, packet data convergence protocol (PDCP) layer, radio resource control (RRC) layer, and service data adaptation protocol (SDAP) layer). The one or more processors 102 and 202 may generate one or more protocol data units (PDUs) and/or one or more service data unit (SDUs) according to the descriptions, functions, procedures, suggestions, methods and/or operational flowcharts disclosed in the present disclosure. The one or more processors 102 and 202 may generate messages, control information, data, or information according to the descriptions, functions, procedures, suggestions, methods and/or operational flowcharts disclosed in the present disclosure. The one or more processors 102 and 202 may generate signals (e.g., baseband signals) including PDUs, SDUs, messages, control information, data, or information according to the descriptions, functions, procedures, suggestions, methods and/or operational flowcharts disclosed in the present disclosure and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, suggestions, methods and/or operational flowcharts disclosed in the present disclosure.

The one or more processors 102 and 202 may be referred to as controllers, microcontrollers, microprocessors, or microcomputers. The one or more processors 102 and 202 may be implemented by hardware, firmware, software, or a combination thereof. As an example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. descriptions, functions, procedures, suggestions, methods and/or operational flowcharts disclosed in the present disclosure may be implemented using firmware or software and the firmware or software may be configured to include the modules, procedures, or functions. Firmware or software configured to perform the descriptions, functions, procedures, suggestions, methods and/or operational flowcharts disclosed in the present disclosure may be included in the one or more processors 102 and 202 or stored in the one or more memories 104 and 204 so as to be driven by the one or more processors 102 and 202. The descriptions, functions, procedures, suggestions, methods and/or operational flowcharts disclosed in the present disclosure may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the descriptions, functions, procedures, suggestions, methods and/or operational flowcharts disclosed in the present disclosure, to one or more other devices. The one or more transceivers 106 and 206 may receive user data, control information, and/or radio signals/channels, mentioned in the descriptions, functions, procedures, suggestions, methods and/or operational flowcharts disclosed in the present disclosure, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices.

The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, suggestions, methods and/or operational flowcharts disclosed in the present disclosure, through the one or more antennas 108 and 208. In the present disclosure, the one or more antennas may be a plurality of physical antennas or a plurality of logical antennas (e.g., antenna ports).

The one or more transceivers 106 and 206 may convert received radio signals/channels, etc., from RF band signals into baseband signals in order to process received user data, control information, radio signals/channels, etc., using the one or more processors 102 and 202. The one or more transceivers 106 and 206 may convert the user data, control information, radio signals/channels, etc., processed using the one or more processors 102 and 202 from the base band signals into the RF band signals. To this end, the one or more transceivers 106 and 206 may include (analog) oscillators and/or filters. For example, the transceivers 106 and 206 can up-convert OFDM baseband signals to a carrier frequency by their (analog) oscillators and/or filters under the control of the processors 102 and 202 and transmit the up-converted OFDM signals at the carrier frequency. The transceivers 106 and 206 may receive OFDM signals at a carrier frequency and down-convert the OFDM signals into OFDM baseband signals by their (analog) oscillators and/or filters under the control of the transceivers 102 and 202.

In the implementations of the present disclosure, a UE may operate as a transmitting device in uplink (UL) and as a receiving device in downlink (DL). In the implementations of the present disclosure, a BS may operate as a receiving device in UL and as a transmitting device in DL. Hereinafter, for convenience of description, it is mainly assumed that the first wireless device 100 acts as the UE, and the second wireless device 200 acts as the BS. For example, the processor(s) 102 connected to, mounted on or launched in the first wireless device 100 may be configured to perform the UE behavior according to an implementation of the present disclosure or control the transceiver(s) 106 to perform the UE behavior according to an implementation of the present disclosure. The processor(s) 202 connected to, mounted on or launched in the second wireless device 200 may be configured to perform the BS behavior according to an implementation of the present disclosure or control the transceiver(s) 206 to perform the BS behavior according to an implementation of the present disclosure.

In the present disclosure, a BS is also referred to as a node B (NB), an eNode B (eNB), or a gNB.

Figure 3:
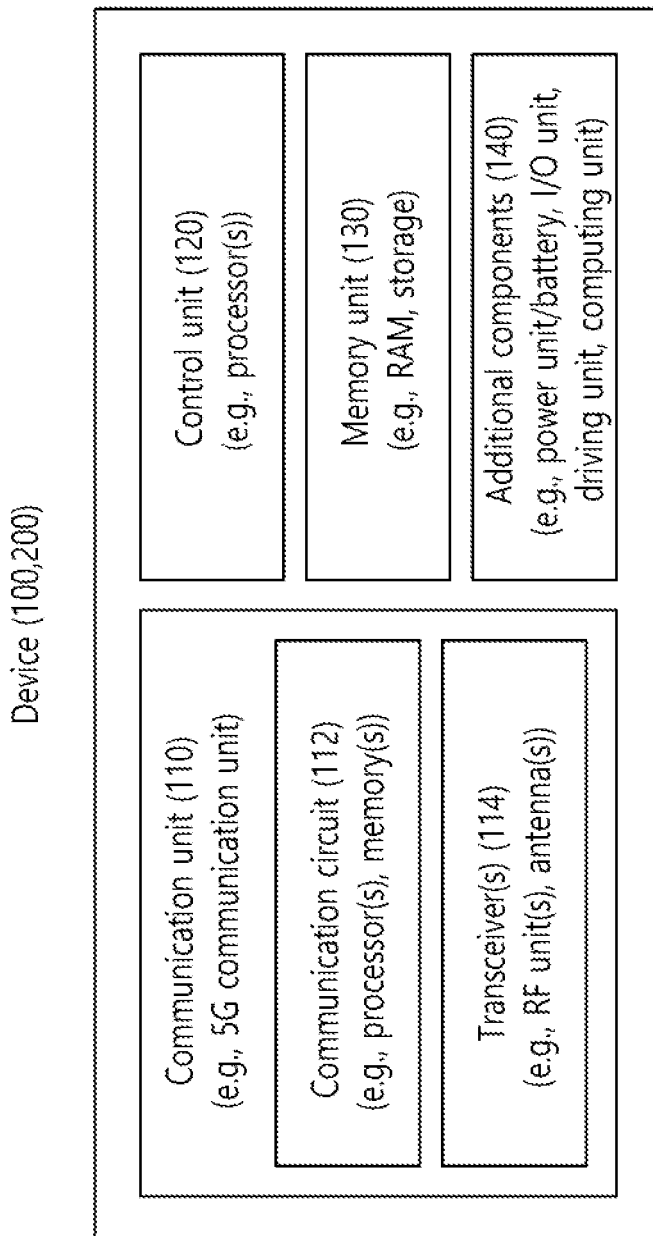
FIG. 3 shows an example of a wireless device to which implementations of the present disclosure is applied.

FIG. 3 shows an example of a wireless device to which implementations of the present disclosure is applied.

The wireless device may be implemented in various forms according to a use-case/service (refer to FIG. 1).

Referring to FIG. 3, wireless devices 100 and 200 may correspond to the wireless devices 100 and 200 of FIG. 2 and may be configured by various elements, components, units/portions, and/or modules. For example, each of the wireless devices 100 and 200 may include a communication unit 110, a control unit 120, a memory unit 130, and additional components 140. The communication unit 110 may include a communication circuit 112 and transceiver(s) 114. For example, the communication circuit 112 may include the one or more processors 102 and 202 of FIG. 2 and/or the one or more memories 104 and 204 of FIG. 2. For example, the transceiver(s) 114 may include the one or more transceivers 106 and 206 of FIG. 2 and/or the one or more antennas 108 and 208 of FIG. 2. The control unit 120 is electrically connected to the communication unit 110, the memory 130, and the additional components 140 and controls overall operation of each of the wireless devices 100 and 200. For example, the control unit 120 may control an electric/mechanical operation of each of the wireless devices 100 and 200 based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of the wireless devices 100 and 200. For example, the additional components 140 may include at least one of a power unit/battery, input/output (I/O) unit (e.g., audio I/O port, video I/O port), a driving unit, and a computing unit. The wireless devices 100 and 200 may be implemented in the form of, without being limited to, the robot (100a of FIG. 1), the vehicles (100b-1 and 100b-2 of FIG. 1), the XR device (100c of FIG. 1), the hand-held device (100d of FIG. 1), the home appliance (100e of FIG. 1), the IoT device (100f of FIG. 1), a digital broadcast terminal, a hologram device, a public safety device, an MTC device, a medicine device, a FinTech device (or a finance device), a security device, a climate/environment device, the AI server/device (400 of FIG. 1), the BSs (200 of FIG. 1), a network node, etc. The wireless devices 100 and 200 may be used in a mobile or fixed place according to a use-example/service.

In FIG. 3, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor (AP), an electronic control unit (ECU), a graphical processing unit, and a memory control processor. As another example, the memory 130 may be configured by a RAM, a DRAM, a ROM, a flash memory, a volatile memory, a non-volatile memory, and/or a combination thereof.

Figure 4:
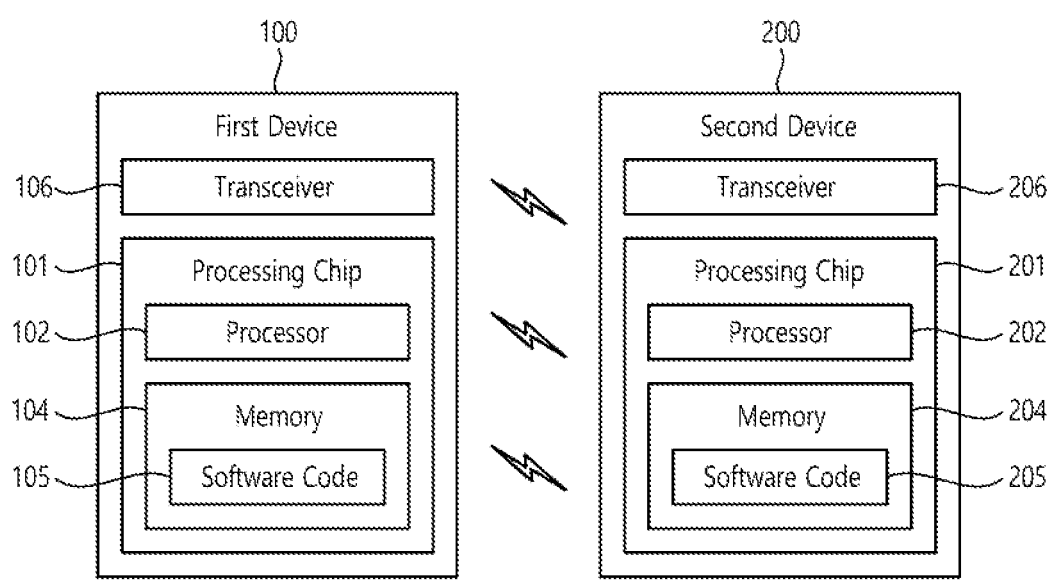
FIG. 4 shows another example of wireless devices to which implementations of the present disclosure is applied.

FIG. 4 shows another example of wireless devices to which implementations of the present disclosure is applied.

Referring to FIG. 4, wireless devices 100 and 200 may correspond to the wireless devices 100 and 200 of FIG. 2 and may be configured by various elements, components, units/portions, and/or modules.

The first wireless device 100 may include at least one transceiver, such as a transceiver 106, and at least one processing chip, such as a processing chip 101. The processing chip 101 may include at least one processor, such a processor 102, and at least one memory, such as a memory 104. The memory 104 may be operably connectable to the processor 102. The memory 104 may store various types of information and/or instructions. The memory 104 may store a software code 105 which implements instructions that, when executed by the processor 102, perform the descriptions, functions, procedures, suggestions, methods and/or operational flowcharts disclosed in the present disclosure. For example, the software code 105 may implement instructions that, when executed by the processor 102, perform the descriptions, functions, procedures, suggestions, methods and/or operational flowcharts disclosed in the present disclosure. For example, the software code 105 may control the processor 102 to perform one or more protocols. For example, the software code 105 may control the processor 102 may perform one or more layers of the radio interface protocol.

The second wireless device 200 may include at least one transceiver, such as a transceiver 206, and at least one processing chip, such as a processing chip 201. The processing chip 201 may include at least one processor, such a processor 202, and at least one memory, such as a memory 204. The memory 204 may be operably connectable to the processor 202. The memory 204 may store various types of information and/or instructions. The memory 204 may store a software code 205 which implements instructions that, when executed by the processor 202, perform the descriptions, functions, procedures, suggestions, methods and/or operational flowcharts disclosed in the present disclosure. For example, the software code 205 may implement instructions that, when executed by the processor 202, perform the descriptions, functions, procedures, suggestions, methods and/or operational flowcharts disclosed in the present disclosure. For example, the software code 205 may control the processor 202 to perform one or more protocols. For example, the software code 205 may control the processor 202 may perform one or more layers of the radio interface protocol.

Figure 5:
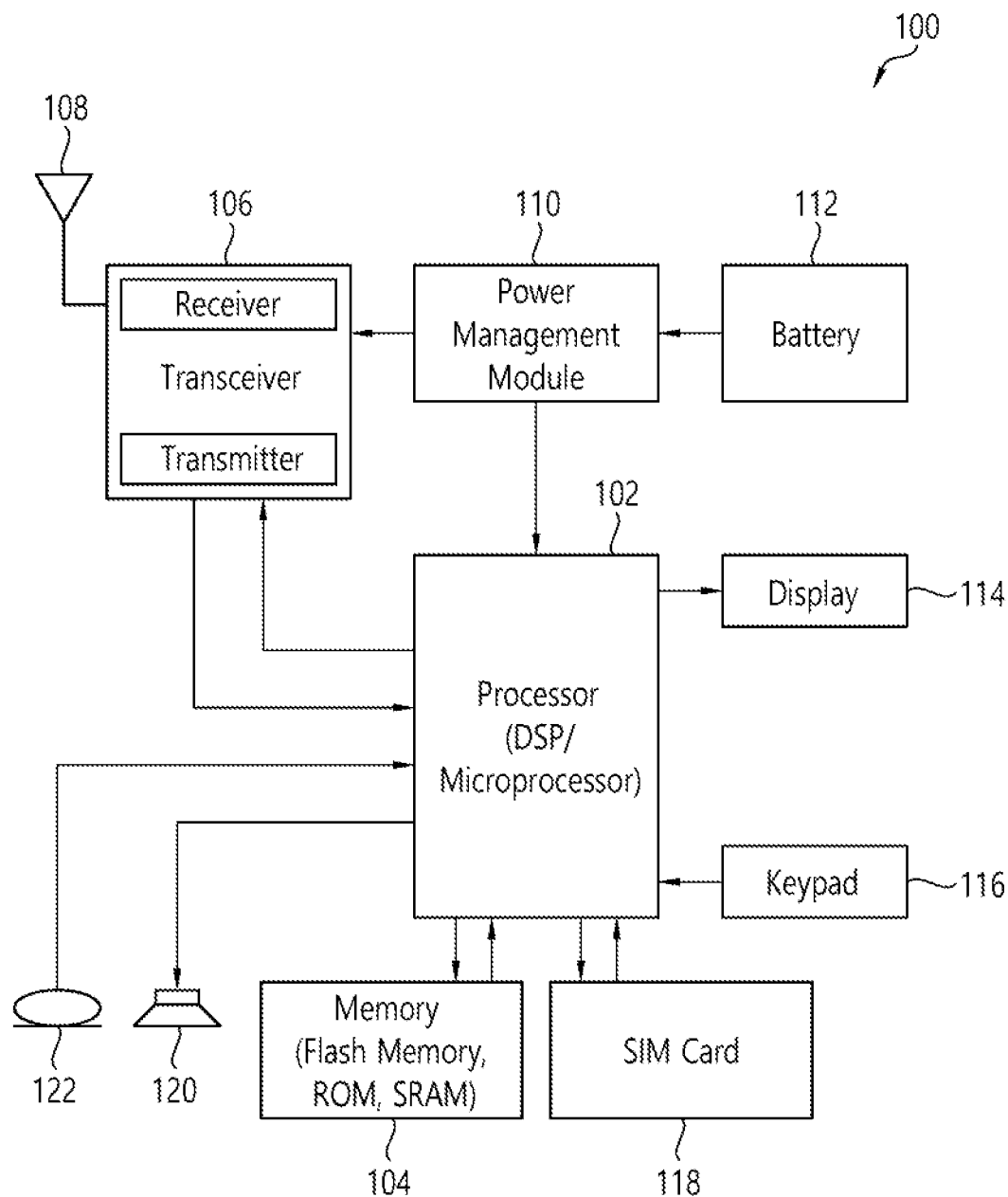
FIG. 5 shows an example of UE to which implementations of the present disclosure is applied.

FIG. 5 shows an example of UE to which implementations of the present disclosure is applied.

Referring to FIG. 5, a UE 100 may correspond to the first wireless device 100 of FIG. 2 and/or the first wireless device 100 of FIG. 4.

A UE 100 includes a processor 102, a memory 104, a transceiver 106, one or more antennas 108, a power management module 110, a battery 1112, a display 114, a keypad 116, a subscriber identification module (SIM) card 118, a speaker 120, and a microphone 122.

The processor 102 may be configured to implement the descriptions, functions, procedures, suggestions, methods and/or operational flowcharts disclosed in the present disclosure. The processor 102 may be configured to control one or more other components of the UE 100 to implement the descriptions, functions, procedures, suggestions, methods and/or operational flowcharts disclosed in the present disclosure. Layers of the radio interface protocol may be implemented in the processor 102. The processor 102 may include ASIC, other chipset, logic circuit and/or data processing device. The processor 102 may be an application processor. The processor 102 may include at least one of a digital signal processor (DSP), a central processing unit (CPU), a graphics processing unit (GPU), a modem (modulator and demodulator). An example of the processor 102 may be found in SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or a corresponding next generation processor.

The memory 104 is operatively coupled with the processor 102 and stores a variety of information to operate the processor 102. The memory 104 may include ROM, RAM, flash memory, memory card, storage medium and/or other storage device. When the embodiments are implemented in software, the techniques described herein can be implemented with modules (e.g., procedures, functions, etc.) that perform the descriptions, functions, procedures, suggestions, methods and/or operational flowcharts disclosed in the present disclosure. The modules can be stored in the memory 104 and executed by the processor 102. The memory 104 can be implemented within the processor 102 or external to the processor 102 in which case those can be communicatively coupled to the processor 102 via various means as is known in the art.

The transceiver 106 is operatively coupled with the processor 102, and transmits and/or receives a radio signal. The transceiver 106 includes a transmitter and a receiver. The transceiver 106 may include baseband circuitry to process radio frequency signals. The transceiver 106 controls the one or more antennas 108 to transmit and/or receive a radio signal.

The power management module 110 manages power for the processor 102 and/or the transceiver 106. The battery 112 supplies power to the power management module 110.

The display 114 outputs results processed by the processor 102. The keypad 116 receives inputs to be used by the processor 102. The keypad 16 may be shown on the display 114.

The SIM card 118 is an integrated circuit that is intended to securely store the international mobile subscriber identity (IMSI) number and its related key, which are used to identify and authenticate subscribers on mobile telephony devices (such as mobile phones and computers). It is also possible to store contact information on many SIM cards.

The speaker 120 outputs sound-related results processed by the processor 102. The microphone 122 receives sound-related inputs to be used by the processor 102.

Figure 6:
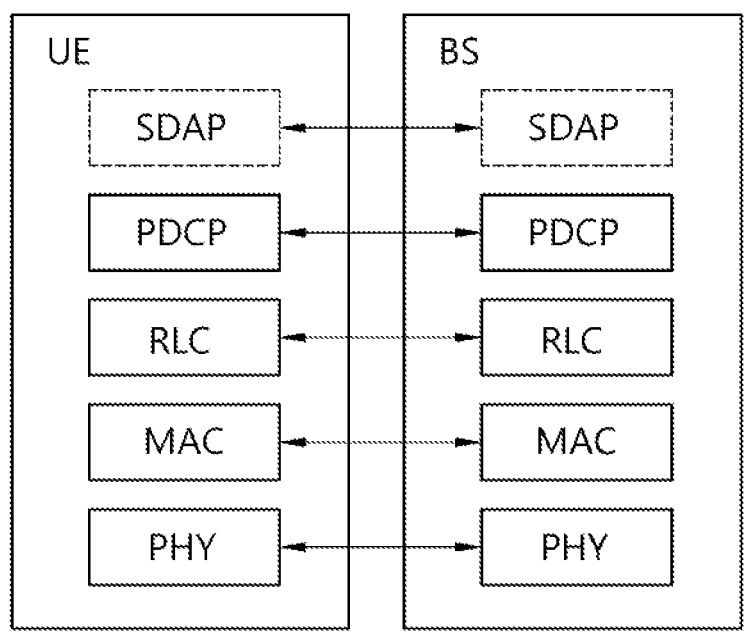
FIGS. 6 and 7 show an example of protocol stacks in a 3GPP based wireless communication system to which implementations of the present disclosure is applied.
Figure 7:
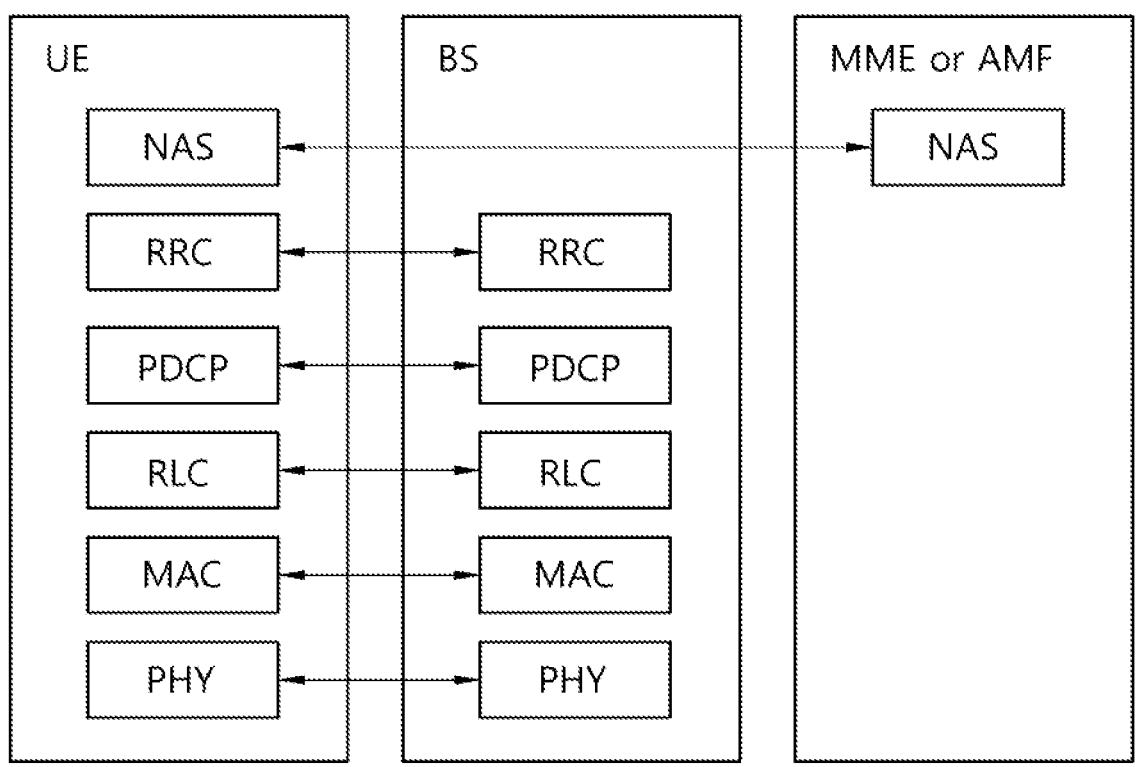

FIGS. 6 and 7 show an example of protocol stacks in a 3GPP based wireless communication system to which implementations of the present disclosure is applied.

In particular, FIG. 6 illustrates an example of a radio interface user plane protocol stack between a UE and a BS and FIG. 7 illustrates an example of a radio interface control plane protocol stack between a UE and a BS. The control plane refers to a path through which control messages used to manage call by a UE and a network are transported. The user plane refers to a path through which data generated in an application layer, for example, voice data or Internet packet data are transported. Referring to FIG. 6, the user plane protocol stack may be divided into Layer 1 (i.e., a PHY layer) and Layer 2. Referring to FIG. 7, the control plane protocol stack may be divided into Layer 1 (i.e., a PHY layer), Layer 2, Layer 3 (e.g., an RRC layer), and a non-access stratum (NAS) layer. Layer 1, Layer 2 and Layer 3 are referred to as an access stratum (AS).

In the 3GPP LTE system, the Layer 2 is split into the following sublayers: MAC, RLC, and PDCP. In the 3GPP NR system, the Layer 2 is split into the following sublayers: MAC, RLC, PDCP and SDAP. The PHY layer offers to the MAC sublayer transport channels, the MAC sublayer offers to the RLC sublayer logical channels, the RLC sublayer offers to the PDCP sublayer RLC channels, the PDCP sublayer offers to the SDAP sublayer radio bearers. The SDAP sublayer offers to 5G core network quality of service (QoS) flows.

In the 3GPP NR system, the main services and functions of the MAC sublayer include: mapping between logical channels and transport channels; multiplexing/de-multiplexing of MAC SDUs belonging to one or different logical channels into/from transport blocks (TB) delivered to/from the physical layer on transport channels; scheduling information reporting; error correction through hybrid automatic repeat request (HARQ) (one HARQ entity per cell in case of carrier aggregation (CA)); priority handling between UEs by means of dynamic scheduling; priority handling between logical channels of one UE by means of logical channel prioritization; padding. A single MAC entity may support multiple numerologies, transmission timings and cells. Mapping restrictions in logical channel prioritization control which numerology(ies), cell(s), and transmission timing(s) a logical channel can use.

Different kinds of data transfer services are offered by MAC. To accommodate different kinds of data transfer services, multiple types of logical channels are defined, i.e., each supporting transfer of a particular type of information. Each logical channel type is defined by what type of information is transferred. Logical channels are classified into two groups: control channels and traffic channels. Control channels are used for the transfer of control plane information only, and traffic channels are used for the transfer of user plane information only. Broadcast control channel (BCCH) is a downlink logical channel for broadcasting system control information, paging control channel (PCCH) is a downlink logical channel that transfers paging information, system information change notifications and indications of ongoing public warning service (PWS) broadcasts, common control channel (CCCH) is a logical channel for transmitting control information between UEs and network and used for UEs having no RRC connection with the network, and dedicated control channel (DCCH) is a point-to-point bi-directional logical channel that transmits dedicated control information between a UE and the network and used by UEs having an RRC connection. Dedicated traffic channel (DTCH) is a point-to-point logical channel, dedicated to one UE, for the transfer of user information. A DTCH can exist in both uplink and downlink. In downlink, the following connections between logical channels and transport channels exist: BCCH can be mapped to broadcast channel (BCH); BCCH can be mapped to downlink shared channel (DL-SCH); PCCH can be mapped to paging channel (PCH); CCCH can be mapped to DL-SCH; DCCH can be mapped to DL-SCH; and DTCH can be mapped to DL-SCH. In uplink, the following connections between logical channels and transport channels exist: CCCH can be mapped to uplink shared channel (UL-SCH); DCCH can be mapped to UL-SCH; and DTCH can be mapped to UL-SCH.

The RLC sublayer supports three transmission modes: transparent mode (TM), unacknowledged mode (UM), and acknowledged node (AM). The RLC configuration is per logical channel with no dependency on numerologies and/or transmission durations. In the 3GPP NR system, the main services and functions of the RLC sublayer depend on the transmission mode and include: transfer of upper layer PDUs; sequence numbering independent of the one in PDCP (UM and AM); error correction through ARQ (AM only); segmentation (AM and UM) and re-segmentation (AM only) of RLC SDUs; reassembly of SDU (AM and UM); duplicate detection (AM only); RLC SDU discard (AM and UM); RLC re-establishment; protocol error detection (AM only).

In the 3GPP NR system, the main services and functions of the PDCP sublayer for the user plane include: sequence numbering; header compression and decompression using robust header compression (ROHC); transfer of user data; reordering and duplicate detection; in-order delivery; PDCP PDU routing (in case of split bearers); retransmission of PDCP SDUs; ciphering, deciphering and integrity protection; PDCP SDU discard; PDCP re-establishment and data recovery for RLC AM; PDCP status reporting for RLC AM; duplication of PDCP PDUs and duplicate discard indication to lower layers. The main services and functions of the PDCP sublayer for the control plane include: sequence numbering; ciphering, deciphering and integrity protection; transfer of control plane data; reordering and duplicate detection; in-order delivery; duplication of PDCP PDUs and duplicate discard indication to lower layers.

In the 3GPP NR system, the main services and functions of SDAP include: mapping between a QoS flow and a data radio bearer; marking QoS flow ID (QFI) in both DL and UL packets. A single protocol entity of SDAP is configured for each individual PDU session.

In the 3GPP NR system, the main services and functions of the RRC sublayer include: broadcast of system information related to AS and NAS; paging initiated by 5GC or NG-RAN; establishment, maintenance and release of an RRC connection between the UE and NG-RAN; security functions including key management; establishment, configuration, maintenance and release of signaling radio bearers (SRBs) and data radio bearers (DRBs); mobility functions (including: handover and context transfer, UE cell selection and reselection and control of cell selection and reselection, inter-RAT mobility); QoS management functions; UE measurement reporting and control of the reporting; detection of and recovery from radio link failure; NAS message transfer to/from NAS from/to UE.

Figure 8:
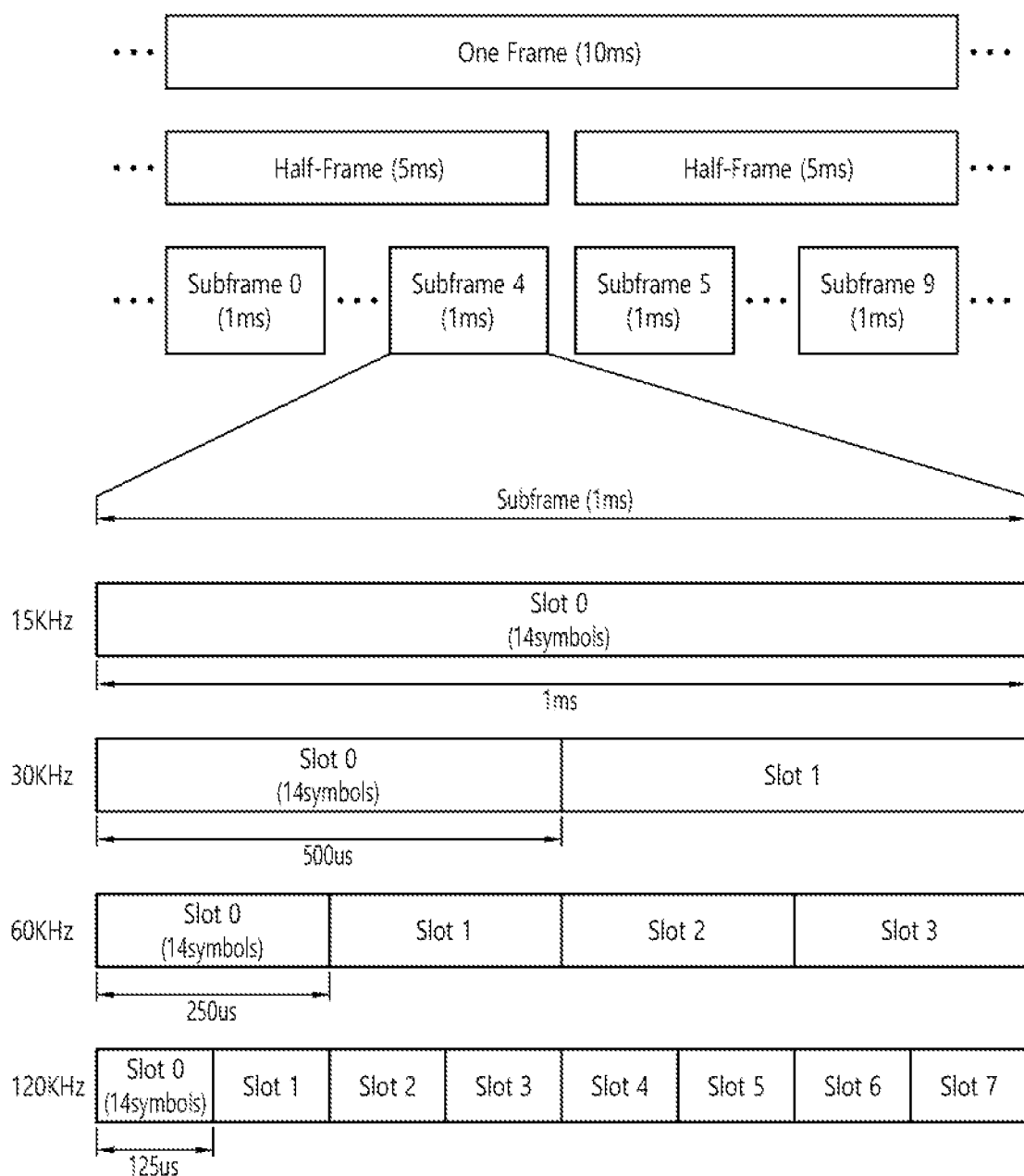
FIG. 8 shows a frame structure in a 3GPP based wireless communication system to which implementations of the present disclosure is applied.

FIG. 8 shows a frame structure in a 3GPP based wireless communication system to which implementations of the present disclosure is applied.

The frame structure shown in FIG. 8 is purely exemplary and the number of subframes, the number of slots, and/or the number of symbols in a frame may be variously changed. In the 3GPP based wireless communication system, OFDM numerologies (e.g., subcarrier spacing (SCS), transmission time interval (TTI) duration) may be differently configured between a plurality of cells aggregated for one UE. For example, if a UE is configured with different SCSs for cells aggregated for the cell, an (absolute time) duration of a time resource (e.g., a subframe, a slot, or a TTI) including the same number of symbols may be different among the aggregated cells. Herein, symbols may include OFDM symbols (or CP-OFDM symbols), SC-FDMA symbols (or discrete Fourier transform-spread-OFDM (DFT-s-OFDM) symbols).

Referring to FIG. 8, downlink and uplink transmissions are organized into frames. Each frame has $T_f=10$ ms duration. Each frame is divided into two half-frames, where each of the half-frames has 5 ms duration. Each half-frame consists of 5 subframes, where the duration $T_{sf}$ per subframe is 1 ms. Each subframe is divided into slots and the number of slots in a subframe depends on a subcarrier spacing. Each slot includes 14 or 12 OFDM symbols based on a cyclic prefix (CP). In a normal CP, each slot includes 14 OFDM symbols and, in an extended CP, each slot includes 12 OFDM symbols. The numerology is based on exponentially scalable subcarrier spacing $\Delta f = 2^u * 15$ kHz.

Table 1 shows the number of OFDM symbols per slot $N^{slot}_{symb}$, the number of slots per frame $N^{frame,u}_{slot}$, and the number of slots per subframe $N^{subframe,u}_{slot}$ for the normal CP, according to the subcarrier spacing $\Delta f = 2^u * 15$ kHz.

TABLE 1

| u | $N^{slot}_{symb}$ | $N^{frame,u}_{slot}$ | $N^{subframe,u}_{slot}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

Table 2 shows the number of OFDM symbols per slot $N^{slot}_{symb}$, the number of slots per frame $N^{frame,u}_{slot}$, and the number of slots per subframe $N^{subframe,u}_{slot}$ for the extended CP, according to the subcarrier spacing $\Delta f = 2^u * 15$ kHz.

TABLE 2

| u | $N^{slot}_{symb}$ | $N^{frame,u}_{slot}$ | $N^{subframe,u}_{slot}$ |
|---|---|---|---|
| 2 | 12 | 40 | 4 |

A slot includes plural symbols (e.g., 14 or 12 symbols) in the time domain. For each numerology (e.g., subcarrier spacing) and carrier, a resource grid of $N^{size,u}_{grid,x} * N^{RB}_{sc}$ subcarriers and $N^{subframe,u}_{symb}$ OFDM symbols is defined, starting at common resource block (CRB) $N^{start,u}_{grid}$ indicated by higher-layer signaling (e.g., RRC signaling), where $N^{size,u}_{grid,x}$ is the number of resource blocks (RBs) in the resource grid and the subscript x is DL for downlink and UL for uplink. $N^{RB}_{sc}$ is the number of subcarriers per RB. In the 3GPP based wireless communication system, $N^{RB}_{sc}$ is 12 generally. There is one resource grid for a given antenna port p, subcarrier spacing configuration u, and transmission direction (DL or UL). The carrier bandwidth $N^{size,u}_{grid}$ for subcarrier spacing configuration u is given by the higher-layer parameter (e.g., RRC parameter). Each element in the resource grid for the antenna port p and the subcarrier spacing configuration u is referred to as a resource element (RE) and one complex symbol may be mapped to each RE. Each RE in the resource grid is uniquely identified by an index k in the frequency domain and an index l representing a symbol location relative to a reference point in the time domain. In the 3GPP based wireless communication system, an RB is defined by 12 consecutive subcarriers in the frequency domain.

In the 3GPP NR system, RBs are classified into CRBs and physical resource blocks (PRBs). CRBs are numbered from 0 and upwards in the frequency domain for subcarrier spacing configuration u. The center of subcarrier 0 of CRB 0 for subcarrier spacing configuration u coincides with 'point A' which serves as a common reference point for resource block grids. In the 3GPP NR system, PRBs are defined within a bandwidth part (BWP) and numbered from 0 to $N^{size}_{BWP,i}-1$, where i is the number of the bandwidth part. The relation between the physical resource block $n_{PRB}$ in the bandwidth part i and the common resource block $n_{CRB}$ is as follows: $n_{PRB}=n_{CRB}+N^{size}_{BWP,i}$, where $N^{size}_{BWP,i}$ is the common resource block where bandwidth part starts relative to CRB 0. The BWP includes a plurality of consecutive RBs. A carrier may include a maximum of N (e.g., 5) BWPs. A UE may be configured with one or more BWPs on a given component carrier. Only one BWP among BWPs configured to the UE can active at a time. The active BWP defines the UE's operating bandwidth within the cell's operating bandwidth.

The NR frequency band may be defined as two types of frequency range, i.e., FR1 and FR2. The numerical value of the frequency range may be changed. For example, the frequency ranges of the two types (FR1 and FR2) may be as shown in Table 3 below. For ease of explanation, in the frequency ranges used in the NR system, FR1 may mean "sub 6 GHz range", FR2 may mean "above 6 GHz range," and may be referred to as millimeter wave (mmW).

TABLE 3

| Frequency Range designation | Corresponding frequency range | Subcarrier Spacing |
|---|---|---|
| FR1 | 450MHz-6000MHz | 15, 30, 60 kHz |
| FR2 | 24250MHz-52600MHz | 60, 120, 240 kHz |

As mentioned above, the numerical value of the frequency range of the NR system may be changed. For example, FR1 may include a frequency band of 410 MHz to 7125 MHz as shown in Table 4 below. That is, FR1 may include a frequency band of 6 GHz (or 5850, 5900, 5925 MHz, etc.) or more. For example, a frequency band of 6 GHz (or 5850, 5900, 5925 MHz, etc.) or more included in FR1 may include an unlicensed band. Unlicensed bands may be used for a variety of purposes, for example for communication for vehicles (e.g., autonomous driving).

TABLE 4

| Frequency Range designation | Corresponding frequency range | Subcarrier Spacing |
|---|---|---|
| FR1 | 410MHz-7125MHz | 15, 30, 60 kHz |
| FR2 | 24250MHz-52600MHz | 60, 120, 240 kHz |

In the present disclosure, the term "cell" may refer to a geographic area to which one or more nodes provide a communication system, or refer to radio resources. A "cell" as a geographic area may be understood as coverage within which a node can provide service using a carrier and a "cell" as radio resources (e.g., time-frequency resources) is associated with bandwidth which is a frequency range configured by the carrier. The "cell" associated with the radio resources is defined by a combination of downlink resources and uplink resources, for example, a combination of a DL component carrier (CC) and a UL CC. The cell may be configured by downlink resources only, or may be configured by downlink resources and uplink resources. Since DL coverage, which is a range within which the node is capable of transmitting a valid signal, and UL coverage, which is a range within which the node is capable of receiving the valid signal from the UE, depends upon a carrier carrying the signal, the coverage of the node may be associated with coverage of the "cell" of radio resources used by the node. Accordingly, the term "cell" may be used to represent service coverage of the node sometimes, radio resources at other times, or a range that signals using the radio resources can reach with valid strength at other times.

In CA, two or more CCs are aggregated. A UE may simultaneously receive or transmit on one or multiple CCs depending on its capabilities. CA is supported for both contiguous and non-contiguous CCs. When CA is configured, the UE only has one RRC connection with the network. At RRC connection establishment/re-establishment/handover, one serving cell provides the NAS mobility information, and at RRC connection re-establishment/handover, one serving cell provides the security input. This cell is referred to as the primary cell (PCell). The PCell is a cell, operating on the primary frequency, in which the UE either performs the initial connection establishment procedure or initiates the connection re-establishment procedure. Depending on UE capabilities, secondary cells (SCells) can be configured to form together with the PCell a set of serving cells. An SCell is a cell providing additional radio resources on top of special cell (SpCell). The configured set of serving cells for a UE therefore always consists of one PCell and one or more SCells. For dual connectivity (DC) operation, the term SpCell refers to the PCell of the master cell group (MCG) or the primary SCell (PSCell) of the secondary cell group (SCG). An SpCell supports PUCCH transmission and contention-based random access, and is always activated. The MCG is a group of serving cells associated with a master node, comprised of the SpCell (PCell) and optionally one or more SCells. The SCG is the subset of serving cells associated with a secondary node, comprised of the PSCell and zero or more SCells, for a UE configured with DC. For a UE in RRC_CONNECTED not configured with CA/DC, there is only one serving cell comprised of the PCell. For a UE in RRC_CONNECTED configured with CA/DC, the term "serving cells" is used to denote the set of cells comprised of the SpCell(s) and all SCells. In DC, two MAC entities are configured in a UE: one for the MCG and one for the SCG.

Figure 9:
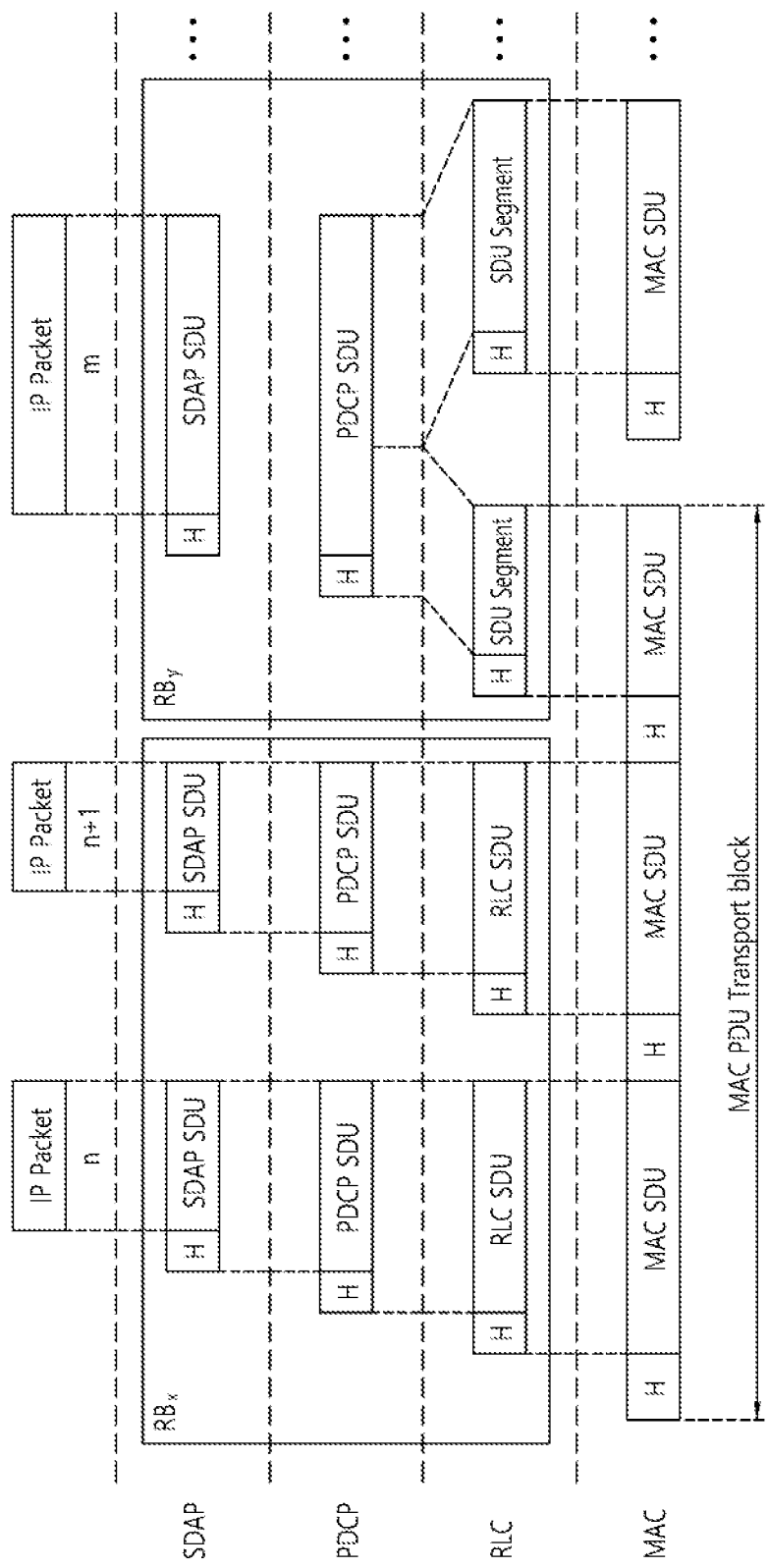
FIG. 9 shows a data flow example in the 3GPP NR system to which implementations of the present disclosure is applied.

FIG. 9 shows a data flow example in the 3GPP NR system to which implementations of the present disclosure is applied.

Referring to FIG. 9, "RB" denotes a radio bearer, and "H" denotes a header. Radio bearers are categorized into two groups: DRBs for user plane data and SRBs for control plane data. The MAC PDU is transmitted/received using radio resources through the PHY layer to/from an external device. The MAC PDU arrives to the PHY layer in the form of a transport block.

In the PHY layer, the uplink transport channels UL-SCH and RACH are mapped to their physical channels PUSCH and PRACH, respectively, and the downlink transport channels DL-SCH, BCH and PCH are mapped to PDSCH, PBCH and PDSCH, respectively. In the PHY layer, uplink control information (UCI) is mapped to PUCCH, and downlink control information (DCI) is mapped to PDCCH. A MAC PDU related to UL-SCH is transmitted by a UE via a PUSCH based on an UL grant, and a MAC PDU related to DL-SCH is transmitted by a BS via a PDSCH based on a DL assignment.

Hereinafter, MBMS is described. Section 5.8 of 3GPP TS 36.331 v15.7.0 may be referred.

In general the control information relevant only for UEs supporting MBMS is separated as much as possible from unicast control information. Most of the MBMS control information is provided on a logical channel specific for MBMS common control information: the MCCH. E-UTRA employs one MCCH logical channel per MBSFN area. In case the network configures multiple MBSFN areas, the UE acquires the MBMS control information from the MCCHs that are configured to identify if services it is interested to receive are ongoing. The action applicable when the UE is unable to simultaneously receive MBMS and unicast services is up to UE implementation. In this release of the specification, an MBMS capable UE is only required to support reception of a single MBMS service at a time, and reception of more than one MBMS service (also possibly on more than one MBSFN area) in parallel is left for UE implementation. The MCCH carries the MBSFNAreaConfiguration message, which indicates the MBMS sessions that are ongoing as well as the (corresponding) radio resource configuration. The MCCH may also carry the MBMSCountingRequest message, when E-UTRAN wishes to count the number of UEs in RRC_CONNECTED that are receiving or interested to receive one or more specific MBMS services.

A limited amount of MBMS control information is provided on the BCCH. This primarily concerns the information needed to acquire the MCCH(s). This information is carried by means of a single MBMS specific SystemInformationBlock: SystemInformationBlockType13. An MBSFN area is identified solely by the mbsfn-AreaId in SystemInformationBlockType13. At mobility, the UE considers that the MBSFN area is continuous when the source cell and the target cell broadcast the same value in the mbsfn-AreaId.

The MCCH information is transmitted periodically, using a configurable repetition period. Scheduling information is not provided for MCCH i.e. both the time domain scheduling as well as the lower layer configuration are semi-statically configured, as defined within SystemInformationBlockType13.

For MBMS user data, which is carried by the MTCH logical channel, E-UTRAN periodically provides MCH scheduling information (MSI) at lower layers (MAC). This MCH information only concerns the time domain scheduling i.e. the frequency domain scheduling and the lower layer configuration are semi-statically configured. The periodicity of the MSI is configurable and defined by the MCH scheduling period.

Change of MCCH information only occurs at specific radio frames, i.e. the concept of a modification period is used. Within a modification period, the same MCCH information may be transmitted a number of times, as defined by its scheduling (which is based on a repetition period). The modification period boundaries are defined by SFN values for which SFN mod m=0, where m is the number of radio frames comprising the modification period. The modification period is configured by means of SystemInformationBlockType13.

When the network changes (some of) the MCCH information, it notifies the UEs about the change during a first modification period. In the next modification period, the network transmits the updated MCCH information. Upon receiving a change notification, a UE interested to receive MBMS services acquires the new MCCH information immediately from the start of the next modification period. The UE applies the previously acquired MCCH information until the UE acquires the new MCCH information.

Indication of an MBMS specific RNTI, the M-RNTI, the PDCCH is used to inform UEs in RRC_IDLE and UEs in RRC_CONNECTED about an MCCH information change. When receiving an MCCH information change notification, the UE knows that the MCCH information will change at the next modification period boundary. The notification on PDCCH indicates which of the MCCHs will change, which is done by means of an 8-bit bitmap. Within this bitmap, the bit at the position indicated by the field notificationIndicator is used to indicate changes for that MBSFN area: if the bit is set to "1", the corresponding MCCH will change. No further details are provided e.g. regarding which MCCH information will change. The MCCH information change notification is used to inform the UE about a change of MCCH information upon session start or about the start of MBMS counting.

The MCCH information change notifications on PDCCH are transmitted periodically and are carried on MBSFN subframes only except on MBMS-dedicated cell or FeMBMS/Unicast-mixed cell where the MCCH information change is provided on non-MBSFN subframes. These MCCH information change notification occasions are common for all MCCHs that are configured, and configurable by parameters included in SystemInformationBlockType13: a repetition coefficient, a radio frame offset and a subframe index. These common notification occasions are based on the MCCH with the shortest modification period.

E-UTRAN may modify the MBMS configuration information provided on MCCH at the same time as updating the MBMS configuration information carried on BCCH i.e. at a coinciding BCCH and MCCH modification period. Upon detecting that a new MCCH is configured on BCCH, a UE interested to receive one or more MBMS services should acquire the MCCH, unless it knows that the services it is interested in are not provided by the corresponding MBSFN area.

A UE that is receiving an MBMS service via MRB shall acquire the MCCH information from the start of each modification period. A UE interested to receive MBMS from a carrier on which dl-Bandwidth included in MasterInformationBlock is set to n6 shall acquire the MCCH information at least once every MCCH modification period. A UE that is not receiving an MBMS service via MRB, as well as UEs that are receiving an MBMS service via MRB but potentially interested to receive other services not started yet in another MBSFN area from a carrier on which dl-Bandwidth included in MasterInformationBlock is other than n6, shall verify that the stored MCCH information remains valid by attempting to find the MCCH information change notification at least notificationRepetitionCoeff times during the modification period of the applicable MCCH(s), if no MCCH information change notification is received.

In case the UE is aware which MCCH(s) E-UTRAN uses for the service(s) it is interested to receive, the UE may only need to monitor change notifications for a subset of the MCCHs that are configured, referred to as the 'applicable MCCH(s)' in the above.

The UE applies the MCCH information acquisition procedure to acquire the MBMS control information that is broadcasted by the E-UTRAN. The procedure applies to MBMS capable UEs that are in RRC_IDLE or in RRC_CONNECTED.

A UE interested to receive MBMS services shall apply the MCCH information acquisition procedure upon entering the corresponding MBSFN area (e.g. upon power on, following UE mobility) and upon receiving a notification that the MCCH information has changed. A UE that is receiving an MBMS service shall apply the MCCH information acquisition procedure to acquire the MCCH, that corresponds with the service that is being received, at the start of each modification period.

Unless explicitly stated otherwise in the procedural specification, the MCCH information acquisition procedure overwrites any stored MCCH information, i.e. delta configuration is not applicable for MCCH information and the UE discontinues using a field if it is absent in MCCH information unless explicitly specified otherwise.

The MBMS PTM radio bearer configuration procedure is used by the UE to configure RLC, MAC and the physical layer upon starting and/or stopping to receive an MRB. The procedure applies to UEs interested to receive one or more MBMS services.

In case the UE is unable to receive an MBMS service due to capability limitations, upper layers may take appropriate action e.g. terminate a lower priority unicast service.

The UE applies the MRB establishment procedure to start receiving a session of a service it has an interest in. The procedure may be initiated e.g. upon start of the MBMS session, upon (re-)entry of the corresponding MBSFN service area, upon becoming interested in the MBMS service, upon removal of UE capability limitations inhibiting reception of the concerned service.

The UE applies the MRB release procedure to stop receiving a session. The procedure may be initiated e.g. upon stop of the MBMS session, upon leaving the corresponding MBSFN service area, upon losing interest in the MBMS service, when capability limitations start inhibiting reception of the concerned service.

The purpose of this procedure is to inform E-UTRAN that the UE is receiving or is interested to receive MBMS service(s) via an MRB or SC-MRB, and if so, to inform E-UTRAN about the priority of MBMS versus unicast reception or MBMS service(s) reception in receive only mode.

An MBMS or SC-PTM capable UE in RRC_CONNECTED may initiate the procedure in several cases including upon successful connection establishment, upon entering or leaving the service area, upon session start or stop, upon change of interest, upon change of priority between MBMS reception and unicast reception, upon change to a PCell broadcasting SystemInformationBlockType15, upon starting and stopping of MBMS service(s) in receive only mode, upon change of receive only mode frequency, bandwidth or subcarrier spacing of MBMS service(s) in receive only mode.

Upon initiating the procedure, the UE shall:
1> if SystemInformationBlockType15 is broadcast by the PCell; or
1> if mbms-ROM-ServiceIndication is received in SystemInformationBlockType2 from PCell:
2> ensure having a valid version of SystemInformationBlockType15 for the PCell, if present;
2> if the UE did not transmit an MBMSInterestIndication message since last entering RRC_CONNECTED state; or
2> if since the last time the UE transmitted an MBMSInterestIndication message, the UE connected to a PCell neither broadcasting SystemInformationBlockType15 nor including mbms-ROM-ServiceIndication in SystemInformationBlockType2:
3> if the set of MBMS frequencies of interest is not empty:
4> initiate transmission of the MBMSInterestIndication message;
2> else:
3> if the set of MBMS frequencies of interest has changed since the last transmission of the MBMSInterestIndication message; or
3> if at least one of the subcarrier spacing or bandwidth parameter of receive only mode MBMS frequency of interest has changed since the last transmission of the MBMSInterestIndication message; or
3> if the prioritisation of reception of all indicated MBMS frequencies compared to reception of any of the established unicast bearers has changed since the last transmission of the MBMSInterestIndication message:
4> initiate transmission of the MBMSInterestIndication message;

The UE may send an MBMSInterestIndication even when it is able to receive the MBMS services it is interested in i.e. to avoid that the network allocates a configuration inhibiting MBMS reception.
3> else if SystemInformationBlockType20 is broadcast by the PCell:
4> if since the last time the UE transmitted an MBMSInterestIndication message, the UE connected to a PCell not broadcasting SystemInformationBlockType20; or
4> if the set of MBMS services of interest is different from mbms-Services included in the last transmission of the MBMSInterestIndication message;
5> initiate the transmission of the MBMSInterestIndication message Determining MBMS frequencies of interest is described.
The UE shall:
1> consider a frequency to be part of the MBMS frequencies of interest if the following conditions are met:
2> at least one MBMS session the UE is receiving or interested to receive via an MRB or SC-MRB is ongoing or about to start; and The UE may determine whether the session is ongoing from the start and stop time indicated in the User Service Description (USD).
2> for at least one of these MBMS sessions either SystemInformationBlockType15 acquired from the PCell includes for the concerned frequency one or more MBMS SAIs as indicated in the USD for this session or this session is in receive only mode; and The UE considers a frequency to be part of the MBMS frequencies of interest even though E-UTRAN may (temporarily) not employ an MRB or SC-MRB for the concerned session. I.e. the UE does not verify if the session is indicated on (SC-)MCCH The UE considers the frequencies of interest independently of any synchronization state.

2> the UE is capable of simultaneously receiving MRBs and/or is capable of simultaneously receiving SC-MRBs on the set of MBMS frequencies of interest, regardless of whether a serving cell is configured on each of these frequencies or not; and 2> the supportedBandCombination the UE included in UE-EUTRA-Capability contains at least one band combination including the set of MBMS frequencies of interest;

Indicating a frequency implies that the UE supports SystemInformationBlockType13 or SystemInformationBlockType20 acquisition for the concerned frequency i.e. the indication should be independent of whether a serving cell is configured on that frequency.

When evaluating which frequencies it can receive simultaneously, the UE does not take into account the serving frequencies that are currently configured i.e. it only considers MBMS frequencies it is interested to receive.

The set of MBMS frequencies of interest includes at most one frequency for a given physical frequency. The UE only considers a physical frequency to be part of the MBMS frequencies of interest if it supports at least one of the bands indicated for this physical frequency in SystemInformationBlockType1 (for serving frequency) or SystemInformationBlockType15 (for neighbouring frequencies). In this case, E-UTRAN may assume the UE supports MBMS reception on any of the bands supported by the UE (i.e. according to supportedBandCombination).

Determining MBMS services of interest is described.

The UE shall:

1> consider a MBMS service to be part of the MBMS services of interest if the following conditions are met:

2> the UE is SC-PTM capable; and

2> the UE is receiving or interested to receive this service via an SC-MRB; and

2> one session of this service is ongoing or about to start; and

2> one or more MBMS SAIs in the USD for this service is included in SystemInformationBlockType15 acquired from the PCell for a frequency belonging to the set of MBMS frequencies of interest.

Actions related to transmission of MBMSInterestIndication message are described.

The UE shall set the contents of the MBMSInterestIndication message as follows:

1> if the set of MBMS frequencies of interest is not empty:

2> include mbms-FreqList and set it to include the MBMS frequencies of interest sorted by decreasing order of interest, using the EARFCN corresponding with freqBandIndicator included in SystemInformationBlockType1 (for serving frequency), if applicable, and the EARFCN(s) as included in SystemInformationBlockType15 (for neighbouring frequencies);

The EARFCN included in rnbrns-FreqList is merely used to indicate a physical frequency the UE is interested to receive i.e. the UE may not support the band corresponding to the included EARFCN (but it does support at least one of the bands indicated in system information for the concerned physical frequency).

2> include rnbrns-Priority if the UE prioritises reception of all indicated MBMS frequencies above reception of any of the unicast bearers;

2> if SystemInformationBlockType20 is broadcast by the PCell:

3> include mbms-Services and set it to indicate the set of MBMS services of interest determined;

If the UE prioritises MBMS reception and unicast data cannot be supported because of congestion on the MBMS carrier(s), E-UTRAN may initiate release of unicast bearers. It is up to E-UTRAN implementation whether all bearers or only GBR bearers are released. E-UTRAN does not initiate re-establishment of the released unicast bearers upon alleviation of the congestion.

1> if the UE is receiving MBMS service(s) in receive only mode:

2> if the supportedBandCombination the UE included in UE-EUTRA-Capability contains at least one band combination including the mbms-ROM-Freq:

3> include mbms-ROM-Freq, mbms-ROM-Subcarrier-Spacing and mbms-Bandwidth;

The EARFCN included in mbms-ROM-Freq is used to indicate a physical frequency the UE is interested to receive MBMS service(s) in receive only mode and is determined based on UE implementation.

The UE shall submit the MBMSInterestIndication message to lower layers for transmission.

SC-PTM is described.

SC-PTM control information is provided on a specific logical channel: the SC-MCCH. The SC-MCCH carries the SCPTMConfiguration message which indicates the MBMS sessions that are ongoing as well as the (corresponding) information on when each session may be scheduled, i.e. scheduling period, scheduling window and start offset. The SCPTMConfiguration message also provides information about the neighbour cells transmitting the MBMS sessions which are ongoing on the current cell. In this release of the specification, an SC-PTM capable UE is only required to support reception of a single MBMS service at a time, and reception of more than one MBMS service in parallel is left for UE implementation.

A limited amount of SC-PTM control information is provided on the BCCH or BR-BCCH. This primarily concerns the information needed to acquire the SC-MCCH.

The SC-MCCH information (i.e. information transmitted in messages sent over SC-MCCH) is transmitted periodically, using a configurable repetition period. SC-MCCH transmissions (and the associated radio resources and MCS) are indicated on PDCCH.

The UE applies the SC-MCCH information acquisition procedure to acquire the SC-PTM control information that is broadcast by the E-UTRAN. The procedure applies to SC-PTM capable UEs that are in RRC_IDLE except for BL UEs, UEs in CE and NB-IoT UEs, performing EDT procedure. This procedure also applies to SC-PTM capable UEs that are in RRC_CONNECTED except for BL UEs, UEs in CE or NB-IoT UEs.

The SC-PTM radio bearer configuration procedure is used by the UE to configure RLC, MAC and the physical layer upon starting and/or stopping to receive an SC-MRB transmitted on SC-MTCH. The procedure applies to SC-PTM capable UEs that are in RRC_IDLE and to SC-PTM capable UEs that are not BL UEs, UEs in CE or NB-IoT UEs in RRC_CONNECTED, and are interested to receive one or more MBMS services via SC-MRB.

Hereinafter, Reception of broadcast information is described. Section 6 of 3GPP TS 36.304 v15.4.0 may be referred.

The NAS is informed if the cell selection and reselection results in changes in the received NAS system information.

The UE shall monitor the Paging Occasions (POs) to receive System Information change notifications in RRC_IDLE. Changes in the system information are indicated by the network using a Paging message or Direct Indication information on MPDCCH and NPDCCH respectively. When the Paging message or Direct Indication information indicates system information changes then the UE shall re-acquire the concerned system information.

A UE, except for BL UE or UE in enhanced coverage or NB-IoT UE, interested to receive MBMS services provided using MBSFN transmission shall apply the MCCH information acquisition procedure to receive the MCCH information upon entering the corresponding MBSFN area and upon receiving a notification that the MCCH information has changed. A UE interested to receive MBMS services provided using MBSFN transmission identifies if a service that it is interested to receive is started or ongoing by receiving the MCCH information, and then receives a MTCH corresponding to the identified service.

A UE interested to receive MBMS services provided using SC-PTM transmission shall apply the SC-MCCH information acquisition procedure to receive the SC-MCCH information upon entering a new cell and upon receiving a notification that the SC-MCCH information has changed. A UE interested to receive MBMS services provided using SC-PTM transmission identifies if a service that it is interested to receive is started or ongoing by receiving the SC-MCCH information, and then receives a SC-MTCH configured using the SC-MRB establishment procedure and using the DL-SCH reception and SC-PTM DRX procedure.

For BL UE or UE in enhanced coverage or NB-IoT UE interested to receive MBMS services provided using SC-PTM transmission, in case of conflict, reception of paging or establishment of a RRC connection for Mobile Terminated Call and Mobile Originated Signalling takes precedence over SC-PTM reception.

Hereinafter, waveform, numerology and frame structure are described. Section 5.1 of 3GPP TS 38.300 v15.7.0 may be referred.

The downlink transmission waveform is conventional OFDM using a cyclic prefix. The uplink transmission waveform is conventional OFDM using a cyclic prefix with a transform precoding function performing DFT spreading that can be disabled or enabled.

The numerology is based on exponentially scalable sub-carrier spacing $\Delta f = 2^u * 15$ kHz with $p=\{0,1,3,4\}$ for PSS, SSS and PBCH and $p=\{0,1,2,3\}$ for other channels. Normal CP is supported for all sub-carrier spacings, Extended CP is supported for p=2.

12 consecutive sub-carriers form a Physical Resource Block (PRB). Up to 275 PRBs are supported on a carrier.

Table 5 shows supported transmission numerologies.

TABLE 5

| u | $\Delta f = 2^u *$ 15 kHz | Cyclic prefix | Supported for data | Supported for synch |
|---|---|---|---|---|
| 0 | 15 | Normal | Yes | Yes |
| 1 | 30 | Normal | Yes | Yes |
| 2 | 60 | Normal, Extended | Yes | No |
| 3 | 120 | Normal | Yes | Yes |
| 4 | 240 | Normal | No | Yes |

The UE may be configured with one or more bandwidth parts on a given component carrier, of which only one can be active at a time respectively. The active bandwidth part defines the UE's operating bandwidth within the cell's operating bandwidth. For initial access, and until the UE's configuration in a cell is received, initial bandwidth part detected from system information is used. Downlink and uplink transmissions are organized into frames with 10 ms duration, consisting of ten 1 ms subframes. Each frame is divided into two equally-sized half-frames of five subframes each. The slot duration is 14 symbols with Normal CP and 12 symbols with Extended CP, and scales in time as a function of the used sub-carrier spacing so that there is always an integer number of slots in a subframe.

Timing Advance TA is used to adjust the uplink frame timing relative to the downlink frame timing.

Hereinafter, Bandwidth part is described. Section 4.4.5 of 3GPP TS 38.211 V15.7.0 may be referred.

A bandwidth part is a subset of contiguous common resource blocks for a given numerology in bandwidth part on a given carrier.

A UE can be configured with up to four bandwidth parts in the downlink with a single downlink bandwidth part being active at a given time. The UE is not expected to receive PDSCH, PDCCH, or CSI-RS (except for RRM) outside an active bandwidth part.

A UE can be configured with up to four bandwidth parts in the uplink with a single uplink bandwidth part being active at a given time. If a UE is configured with a supplementary uplink, the UE can in addition be configured with up to four bandwidth parts in the supplementary uplink with a single supplementary uplink bandwidth part being active at a given time. The UE shall not transmit PUSCH or PUCCH outside an active bandwidth part. For an active cell, the UE shall not transmit SRS outside an active bandwidth part.

Figure 10:
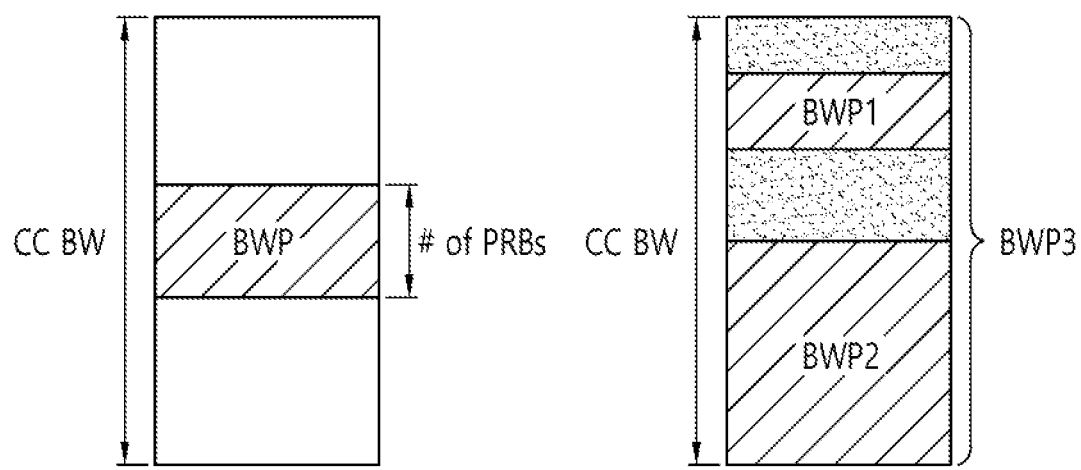
FIG. 10 shows an example of bandwidth part (BWP) configurations to which implementations of the present disclosure is applied.

FIG. 10 shows an example of bandwidth part (BWP) configurations to which implementations of the present disclosure is applied.

Referring to FIG. 10, BWP consists of a group of contiguous physical resource blocks (PRBs). The bandwidth (BW) of BWP cannot exceed the configured component carrier (CC) BW for the UE. The BW of the BWP must be at least as large as one synchronization signal (SS) block BW, but the BWP may or may not contain SS block. Each BWP is associated with a specific numerology, i.e., sub-carrier spacing (SCS) and cyclic prefix (CP) type. Therefore, the BWP is also a means to reconfigure a UE with a certain numerology.

As illustrated in the right figure of FIG. 10, the network can configure multiple BWPs to a UE via radio resource control (RRC) signaling, which may overlap in frequency. The granularity of BWP configuration is one PRB. For each serving cell, DL and UL BWPs are configured separately and independently for paired spectrum and up to four BWPs can be configured for DL and UL each. For unpaired spectrum, a DL BWP and a UL BWP are jointly configured as a pair and up to 4 pairs can be configured. There can be maximally 4 UL BWPs configured for a supplemental UL (SUL) as well.

FIG. 11 shows an example of contiguous BWPs and non-contiguous BWPs to which implementations of the present disclosure is applied Referring to FIG. 11, for serving cell measurements, a UE may be configured with multiple BWPs contiguously or non-contiguously. In order to derive quality of the serving cell, the UE measures only configured BWPs, not all BWPs that belongs to the serving cell.

Each configured DL BWP includes at least one control resource set (CORESET) with UE-specific search space (USS). The USS is a searching space for UE to monitor possible reception of control information destined for the UE. In the primary carrier, at least one of the configured DL BWPs includes one CORESET with common search space (CSS). The CSS is a searching space for UE to monitor possible reception of control information common for all UEs or destined for the particular UE. If the CORESET of an active DL BWP is not configured with CSS, the UE is not required to monitor it. Note that UEs are expected to receive and transmit only within the frequency range configured for the active BWPs with the associated numerologies. However, there are exceptions. A UE may perform Radio Resource Management (RRM) measurement or transmit sounding reference signal (SRS) outside of its active BWP via measurement gap.

Figure 12:
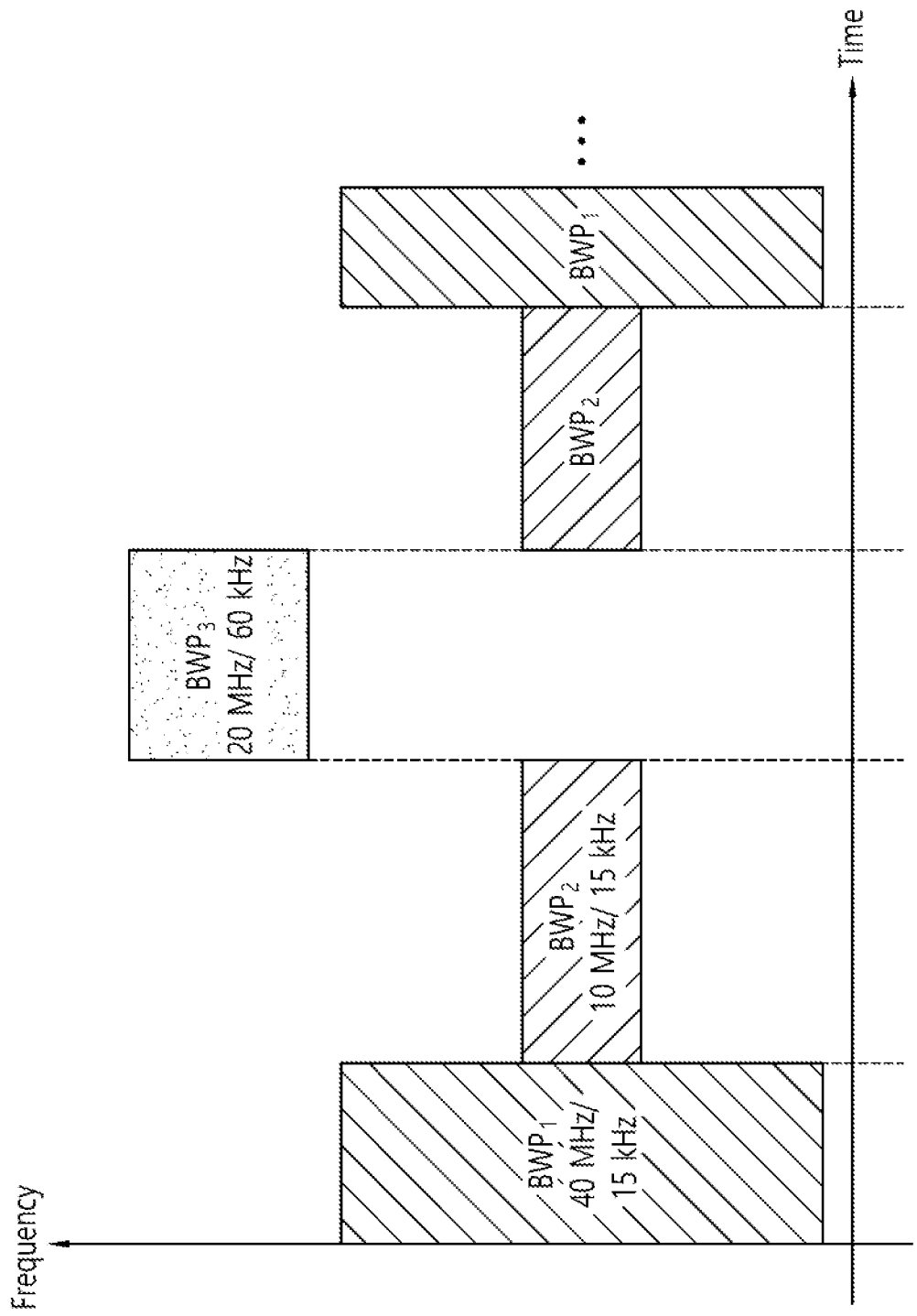
FIG. 12 shows an example of multiple BWPs to which implementations of the present disclosure is applied.

FIG. 12 shows an example of multiple BWPs to which implementations of the present disclosure is applied.

Referring to FIG. 12, three BWPs may be configured. The first BWP may span 40 MHz band, and a subcarrier spacing of 15 kHz may be applied. The second BWP may span 10 MHz band, and a subcarrier spacing of 15 kHz may be applied. The third BWP may span 20 MHz band and a subcarrier spacing of 60 kHz may be applied. The UE may configure at least one BWP among the 3 BWPs as an active BWP, and may perform UL and/or DL data communication via the active BWP.

The BWP is also a tool to switch the operating numerology of a UE. The numerology of the DL BWP configuration is used at least for the Physical Downlink Control Channel (PDCCH), Physical Downlink Shared Channel (PDSCH) and corresponding demodulation RS (DMRS). Likewise, the numerology of the UL BWP configuration is used at least for the Physical Uplink Control Channel (PUCCH), Physical Uplink Shared Channel (PUSCH) and corresponding DMRS. On the other hand, it is noted that there is a restriction in the configuration of numerology at least in the early version of NR. That is, the same numerology shall be used within the same PUCCH group including both DL and UL.

With Bandwidth Adaptation (BA), the receive and transmit bandwidth of a UE need not be as large as the bandwidth of the cell and can be adjusted: the width can be ordered to change (e.g. to shrink during period of low activity to save power); the location can move in the frequency domain (e.g. to increase scheduling flexibility); and the subcarrier spacing can be ordered to change (e.g. to allow different services). A subset of the total cell bandwidth of a cell is referred to as a Bandwidth Part (BWP) and BA is achieved by configuring the UE with BWP(s) and telling the UE which of the configured BWPs is currently the active one.

Referring to FIG. 12, there are 3 different BWPs are configured:

$BWP_1$ with a width of 40 MHz and subcarrier spacing of 15 kHz;

$BWP_2$ with a width of 10 MHz and subcarrier spacing of 15 kHz;

$BWP_3$ with a width of 20 MHz and subcarrier spacing of 60 kHz.

Meanwhile, the transmission mode may need to be switched quickly between the unicast and broadcast/multicast depending on the number of users for efficient management of the radio resource.

For example, if the number of UEs that want to receive the service #1 is lower than a threshold, the network will transmit the service to each UE in unicast manner.

On the contrary, if the number of UEs that want to receive the service #2 is higher than a threshold, network will broadcast the service #2 to reduce the radio resource required to provide the service #2.

If the number of user who wants to receive a certain service increases and becomes higher than a threshold, the network would initiate the broadcast for the service. In this case, the network may need to maintain the unicast transmission of the service for a while after the broadcast of the service is started, because the unicast transmission should not be terminated before the UE successfully receives the service in broadcast manner.

However, the network does not know when the UE succeeds in receiving the broadcast, so the network should do the unicast transmission and broadcast for the service in parallel for a sufficiently long period of time, and it may cause huge waste of radio resource.

Therefore, studies for transmitting assistant information for a quick switch between broadcast and unicast transmission in a wireless communication system are required.

Hereinafter, a method for transmitting assistant information for a quick switch between broadcast and unicast transmission in a wireless communication system, according to some embodiments of the present disclosure, will be described with reference to the following drawings.

The following drawings are created to explain specific embodiments of the present disclosure. The names of the specific devices or the names of the specific signals/messages/fields shown in the drawings are provided by way of example, and thus the technical features of the present disclosure are not limited to the specific names used in the following drawings. Herein, a wireless device may be referred to as a user equipment (UE).

Figure 13:
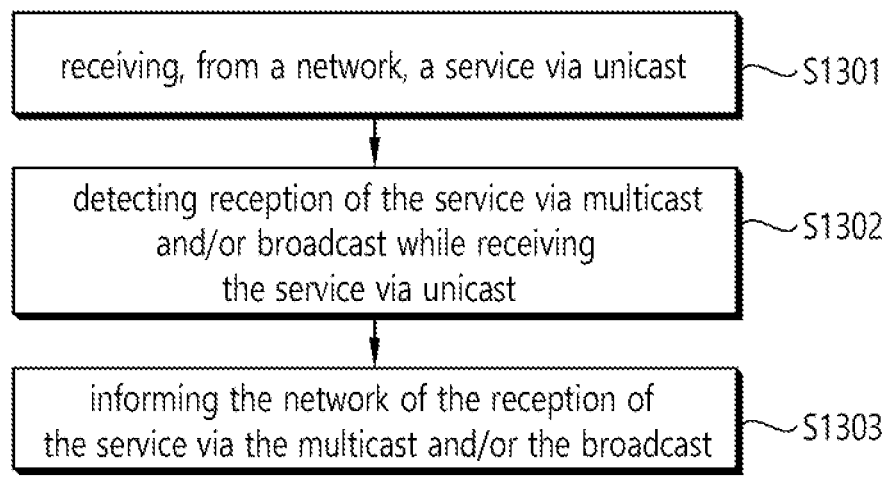
FIG. 13 shows an example of a method for transmitting assistant information for a quick switch between broadcast and unicast transmission in a wireless communication system, according to some embodiments of the present disclosure.

FIG. 13 shows an example of a method for transmitting assistant information for a quick switch between broadcast and unicast transmission in a wireless communication system, according to some embodiments of the present disclosure.

In particular, FIG. 13 shows an example of a method performed by a wireless device.

In step S1301, a wireless device may receive, from a network, a service via unicast.

For example, the service may be a Multicast-Broadcast Services (MBS).

For example, the wireless device may transmit, to the network, an interest indication for the service to receive the service. The network may provide the service via unicast upon receiving the interest indication.

In step S1302, a wireless device may detect reception of the service via multicast and/or broadcast while receiving the service via unicast.

For example, the wireless device may monitor whether the service is provided via broadcast and/or multicast or not, while receiving the service via unicast.

According to some embodiments of the present disclosure, a wireless device may consider that the service is successfully received via multicast and/or broadcast, based on that a Radio Resource Control (RRC) layer of the wireless device receives a notification for the service from a higher layer of the wireless device.

For example, the higher layer may be an application layer or a Non-Access Stratum (NAS) layer, for the service.

According to some embodiments of the present disclosure, a wireless device may consider that the service is successfully received via multicast and/or broadcast, based on detecting a broadcast channel addressed by a Radio Network Temporary Identifier (RNTI) corresponding to the service.

For example, different service may be mapped to different RNTI.

For example, the broadcast channel be (1) a control channel for broadcast and/or multicast or (2) a data channel for broadcast and/or multicast.

For example, the broadcast channel be a Physical Downlink Control Channel (PDCCH) or a Physical Downlink Shared Channel (PDSCH).

In step S1303, a wireless device may inform the network of the reception of the service via the multicast and/or the broadcast.

For example, the service may be not provided via the unicast, after informing the network of the reception of the service via the multicast and/or the broadcast.

For example, an AS layer of the wireless device may inform the network of the reception of the service via the multicast and/or the broadcast, regardless of whether receiving the service via unicast.

For example, a wireless device may transmit, to the network, an assistant information informing the successful reception of the service via the multicast and/or the broadcast, while receiving the service via unicast.

For example, a wireless device may inform the network of an identity of the service. For example, the assistant information may include the identity of the service.

For example, a wireless device may inform the network that the service via unicast is no longer needed. For example, the assistant information may include an indication informing that the service via unicast is no longer needed.

According to some embodiments of the present disclosure, the wireless device may be in communication with at least one of a user equipment, a network, or an autonomous vehicle other than the wireless device.

Figure 14:
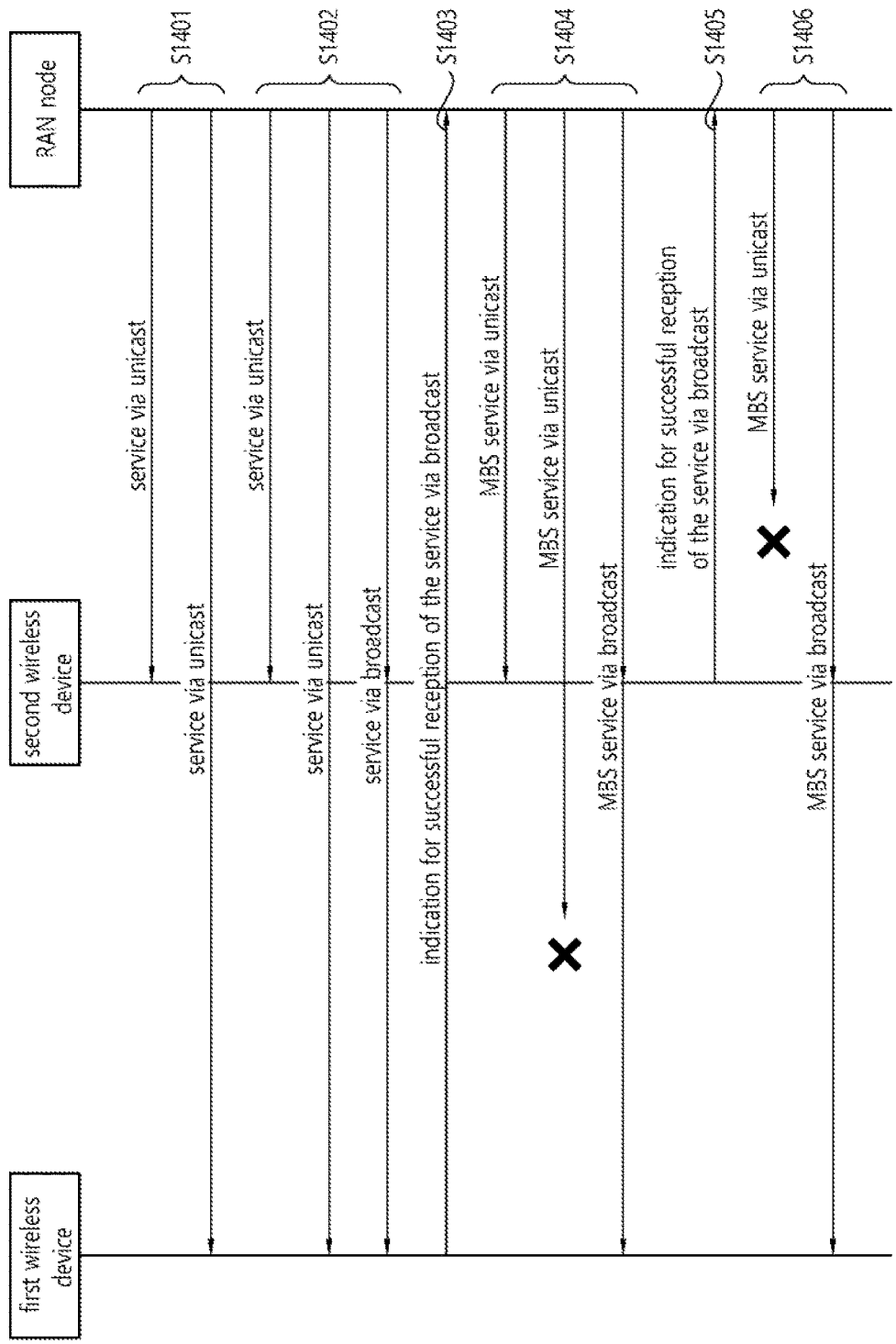
FIG. 14 shows a diagram of a method for transmitting assistant information for a quick switch between broadcast and unicast transmission in a wireless communication system, according to some embodiments of the present disclosure.

FIG. 14 shows a diagram of a method for transmitting assistant information for a quick switch between broadcast and unicast transmission in a wireless communication system, according to some embodiments of the present disclosure.

In FIG. 14, a wireless communication system may include a first wireless device, a second wireless device, and a Radio Access Network (RAN) node.

In step S1401, the first wireless device and the second wireless device may receive a service via unicast from the RAN node. In other words, the RAN node may provide the service to each of the first wireless device and the second wireless device via unicast, respectively.

For example, the first wireless device and the second wireless device may be interested in the service, but the service may be not being broadcast.

In step S1402, the RAN node may provide the service via broad cast while each of the first wireless device and the second wireless device receive the service via unicast.

In step S1403, the first wireless device may transmit, to the RAN node, an indication informing that the first wireless device receives the service from the RAN node via broadcast.

For example, the first wireless device may transmit, to the RAN node, an assistant information related to the successful reception of the service via the broadcast.

In step S1404, the RAN node may stop to provide the service to the first wireless device via unicast.

In this case, the RAN node may still provide the service to the first wireless device and the second wireless device via broadcast, while providing the service to the second wireless device via unicast.

In step S1405, the second wireless device may transmit, to the RAN node, an indication informing that the second wireless device receives the service from the RAN node via broadcast.

For example, the second wireless device may transmit, to the RAN node, an assistant information related to the successful reception of the service via the broadcast.

In step S1406, the RAN node may stop to provide the service to the second wireless device via unicast.

In this case, the RAN node may still provide the service to the first wireless device and the second wireless device via broadcast.

Figure 15:
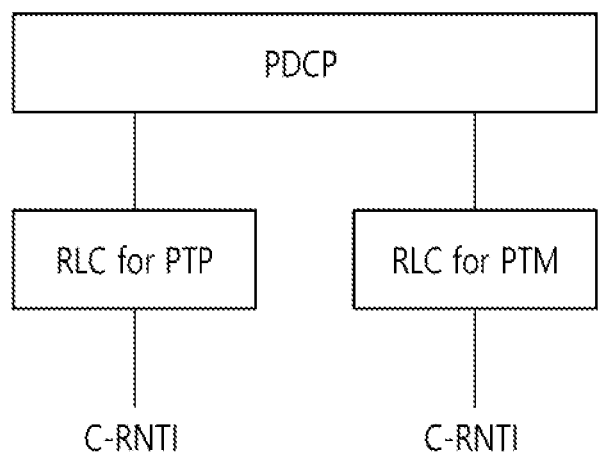
FIG. 15 shows an example of a MBMS Point to Multipoint Radio Bearer (MRB) architecture for a quick switch between broadcast and unicast transmission in a wireless communication system, according to some embodiments of the present disclosure.

FIG. 15 shows an example of a MBMS Point to Multi-point Radio Bearer (MRB) architecture for a quick switch between broadcast and unicast transmission in a wireless communication system, according to some embodiments of the present disclosure.

In FIG. 15, a common PDCP for MRB may act as the anchor for dynamic switch with a split architecture.

For example, the PDCP may be connected with a first RLC for unicast (for example, Point-To-Point (PTP) transmission) and a second RLC for broadcast and/or multicast (for example, Point-To-Multipoint (PTM) transmission).

In other words, in the split architecture with a common PDCP, a wireless device may include two legs for an MBS service, one for PTP and another for PTM.

For example, a wireless device, that has two RLC legs for the MBS service, could perform the dynamic PTP/PTM switching.

For example, the PTP/PTM switching can be done without RRC signalling.

For example, a wireless device may use a Common-Radio Network Temporary Identifier (C-RNTI) for the PTP.

For example, a wireless device may use a Group-RNTI (G-RNTI) for the PTM.

For example, a wireless device may use both the RLC for PTP and the RLC for the PTM simultaneously. In other words, a wireless device could receive a service via multicast and/or broadcast using the RLC for PTM, while receiving the service via unicast using the RLC for PTP.

Figure 16:
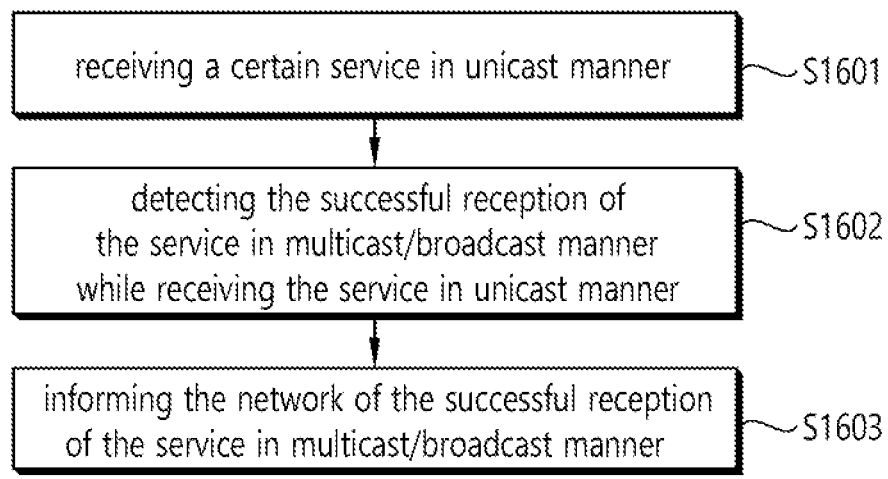
FIG. 16 shows an example of a method for transmitting assistant information for a quick switch between broadcast and unicast transmission in a wireless communication system, according to some embodiments of the present disclosure.

FIG. 16 shows an example of a method for transmitting assistant information for a quick switch between broadcast and unicast transmission in a wireless communication system, according to some embodiments of the present disclosure.

According to the present disclosure, UE may inform the network of the successful reception of a certain service in multicast/broadcast manner, when the UE detects the successful reception of the service in multicast/broadcast manner while receiving the service in unicast manner.

In step S1601, UE may receive a certain service in unicast manner.

For example, UE is interested in a certain service but the service is not being broadcast. Then, the UE may receive the service in unicast manner from network.

In step S1602, UE may detect the successful reception of the service in multicast/broadcast manner while receiving the service in unicast manner.

For example, UE may check whether the service is broadcast or not while the UE receives the service in unicast manner.

For example, UE may consider that the reception of the service in multicast/broadcast manner is successful when the RRC layer in the UE receives a notification from the higher layer, for example, application layer or NAS layer, for the service.

For example, UE may consider that the reception of the service in multicast/broadcast manner is successful when UE detects a broadcast channel addressed by a certain RNTI corresponding to the service. In this case, UE may use different RNTI to monitor different multicast/broadcast service. The broadcast channel may be a control channel for broadcast/multicast (for example, PDCCH), or data channel for broadcast/multicast (for example, PDSCH).

For example, UE may consider that the UE is receiving a service in unicast manner if the UE already informed the network of the interest in the service but doesn't receive the service in multicast/broadcast manner.

For example, the AS layer in UE (for example, RRC layer) may not know whether the service is being received in unicast manner but the AS layer can detect the successful reception of the service in multicast/broadcast manner. In this case, the AS layer in the UE may inform the network of the successful reception of the multicast/broadcast transmission regardless of whether the UE is receiving the service in unicast manner.

In step S1603, UE may inform the network of the successful reception of the service in multicast/broadcast manner.

For example, UE may transmit an indication to the network to indicate the successful reception of the service in multicast/broadcast manner when the UE detects the successful reception of the service in multicast/broadcast manner while receiving the service in unicast manner. The indication may include the service identity, for example, TMGI. The indication may indicate that the unicast transmission for the service included in the indication is no longer needed.

For example, if the network receives the indication including a service identity from the UE, the network may consider the unicast transmission of the service is no long needed and stop the unicast transmission of the service to the UE.

According to some embodiments of the present disclosure, an UE may be receiving service #1 and service #2 via unicast transmission. The UE may detect that the service #1 is received successfully via broadcast. Then, the UE may transmit an indication to the network to indicate the successful reception of the service #1 via broadcast. Then, the network may stop the unicast transmission of the service #1 to the UE.

Hereinafter, an apparatus for transmitting assistant information for a quick switch between broadcast and unicast transmission in a wireless communication system, according to some embodiments of the present disclosure, will be described. Herein, the apparatus may be a wireless device (100 or 200) in FIGS. 2, 3, and 5.

For example, a wireless device may perform methods described in FIGS. 13, 15, and 16. The detailed description overlapping with the above-described contents could be simplified or omitted.

Referring to FIG. 5, a wireless device 100 may include a processor 102, a memory 104, and a transceiver 106.

According to some embodiments of the present disclosure, the processor 102 may be configured to be coupled operably with the memory 104 and the transceiver 106.

The processor 102 may be configured to control the transceiver 106 to receive, from a network, a service via unicast. The processor 102 may be configured to control the transceiver 106 to detect reception of the service via multicast and/or broadcast while receiving the service via unicast. The processor 102 may be configured to control the transceiver 106 to inform the network of the reception of the service via the multicast and/or the broadcast.

For example, the service may be a Multicast-Broadcast Services (MBS).

For example, the service may be not provided via the unicast, after informing the network of the reception of the service via the multicast and/or the broadcast.

For example, the processor 102 may be configured to monitor whether the service is provided via broadcast and/or multicast or not, while receiving the service via unicast.

According to some embodiments of the present disclosure, the processor 102 may be configured to consider that the service is successfully received via multicast and/or broadcast, based on that a Radio Resource Control (RRC) layer of the wireless device receives a notification for the service from a higher layer of the wireless device.

For example, the higher layer may be an application layer or a Non-Access Stratum (NAS) layer, for the service.

According to some embodiments of the present disclosure, the processor 102 may be configured to consider that the service is successfully received via multicast and/or broadcast, based on detecting a broadcast channel addressed by a Radio Network Temporary Identifier (RNTI) corresponding to the service.

For example, the broadcast channel may include at least one of (1) a control channel for broadcast and/or multicast or (2) a data channel for broadcast and/or multicast.

According to some embodiments of the present disclosure, the processor 102 may be configured to control the transceiver 106 to transmit, to the network, an interest indication for the service to receive the service. For example, the service via unicast may be provided, from the network, after transmitting to the interest indication.

For example, the informing the network of the reception of the service via the multicast and/or the broadcast may comprise informing, by an AS layer of the wireless device, the network of the reception of the service via the multicast and/or the broadcast, regardless of whether receiving the service via unicast.

For example, the informing the network of the reception of the service via the multicast and/or the broadcast may comprise transmitting, to the network, an assistant information informing the successful reception of the service via the multicast and/or the broadcast, while receiving the service via unicast.

For example, the informing the network of the reception of the service via the multicast and/or the broadcast may comprise informing the network of an identity of the service.

For example, the informing the network of the reception of the service via the multicast and/or the broadcast may comprise informing the network that the service via unicast is no longer needed.

According to some embodiments of the present disclosure, the processor 102 may be configured to be in communication with at least one of a user equipment, a network, or an autonomous vehicle other than the wireless device.

Hereinafter, a processor for a wireless device for transmitting assistant information for a quick switch between broadcast and unicast transmission in a wireless communication system, according to some embodiments of the present disclosure, will be described.

The processor may be configured to control the wireless device to receive, from a network, a service via unicast. The processor may be configured to control the wireless device to detect reception of the service via multicast and/or broadcast while receiving the service via unicast. The processor may be configured to control the wireless device to inform the network of the reception of the service via the multicast and/or the broadcast.

For example, the service may be a Multicast-Broadcast Services (MBS).

For example, the service may be not provided via the unicast, after informing the network of the reception of the service via the multicast and/or the broadcast.

For example, the processor may be configured to control the wireless device to monitor whether the service is provided via broadcast and/or multicast or not, while receiving the service via unicast.

According to some embodiments of the present disclosure, the processor may be configured to control the wireless device to consider that the service is successfully received via multicast and/or broadcast, based on that a Radio Resource Control (RRC) layer of the wireless device receives a notification for the service from a higher layer of the wireless device.

For example, the higher layer may be an application layer or a Non-Access Stratum (NAS) layer, for the service.

According to some embodiments of the present disclosure, the processor may be configured to control the wireless device to consider that the service is successfully received via multicast and/or broadcast, based on detecting a broadcast channel addressed by a Radio Network Temporary Identifier (RNTI) corresponding to the service.

For example, the broadcast channel may include at least one of (1) a control channel for broadcast and/or multicast or (2) a data channel for broadcast and/or multicast.

According to some embodiments of the present disclosure, the processor may be configured to control the wireless device to transmit, to the network, an interest indication for the service to receive the service. For example, the service via unicast may be provided, from the network, after transmitting to the interest indication.

For example, the informing the network of the reception of the service via the multicast and/or the broadcast may comprise informing, by an AS layer of the wireless device, the network of the reception of the service via the multicast and/or the broadcast, regardless of whether receiving the service via unicast.

For example, the informing the network of the reception of the service via the multicast and/or the broadcast may comprise transmitting, to the network, an assistant information informing the successful reception of the service via the multicast and/or the broadcast, while receiving the service via unicast.

For example, the informing the network of the reception of the service via the multicast and/or the broadcast may comprise informing the network of an identity of the service.

For example, the informing the network of the reception of the service via the multicast and/or the broadcast may comprise informing the network that the service via unicast is no longer needed.

According to some embodiments of the present disclosure, the processor may be configured to control the wireless device to be in communication with at least one of a user equipment, a network, or an autonomous vehicle other than the wireless device.

Hereinafter, a non-transitory computer-readable medium has stored thereon a plurality of instructions for transmitting assistant information for a quick switch between broadcast and unicast transmission in a wireless communication system, according to some embodiments of the present disclosure, will be described.

According to some embodiment of the present disclosure, the technical features of the present disclosure could be embodied directly in hardware, in a software executed by a processor, or in a combination of the two. For example, a method performed by a wireless device in a wireless communication may be implemented in hardware, software, firmware, or any combination thereof. For example, a software may reside in RAM memory, flash memory, ROM memory, EPROM memory, EEPROM memory, registers, hard disk, a removable disk, a CD-ROM, or any other storage medium.

Some example of storage medium is coupled to the processor such that the processor can read information from the storage medium. In the alternative, the storage medium may be integral to the processor. The processor and the storage medium may reside in an ASIC. For other example, the processor and the storage medium may reside as discrete components.

The computer-readable medium may include a tangible and non-transitory computer-readable storage medium.

For example, non-transitory computer-readable media may include random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, or any other medium that can be used to store instructions or data structures. Non-transitory computer-readable media may also include combinations of the above.

In addition, the method described herein may be realized at least in part by a computer-readable communication medium that carries or communicates code in the form of instructions or data structures and that can be accessed, read, and/or executed by a computer.

According to some embodiment of the present disclosure, a non-transitory computer-readable medium has stored thereon a plurality of instructions. The stored a plurality of instructions may be executed by a processor of a wireless device.

The stored a plurality of instructions may cause the wireless device to receive, from a network, a service via unicast. The stored a plurality of instructions may cause the wireless device to detect reception of the service via multicast and/or broadcast while receiving the service via unicast. The stored a plurality of instructions may cause the wireless device to inform the network of the reception of the service via the multicast and/or the broadcast.

For example, the service may be a Multicast-Broadcast Services (MBS).

For example, the service may be not provided via the unicast, after informing the network of the reception of the service via the multicast and/or the broadcast.

For example, the stored a plurality of instructions may cause the wireless device to monitor whether the service is provided via broadcast and/or multicast or not, while receiving the service via unicast.

According to some embodiments of the present disclosure, the stored a plurality of instructions may cause the wireless device to consider that the service is successfully received via multicast and/or broadcast, based on that a Radio Resource Control (RRC) layer of the wireless device receives a notification for the service from a higher layer of the wireless device.

For example, the higher layer may be an application layer or a Non-Access Stratum (NAS) layer, for the service.

According to some embodiments of the present disclosure, the stored a plurality of instructions may cause the wireless device to consider that the service is successfully received via multicast and/or broadcast, based on detecting a broadcast channel addressed by a Radio Network Temporary Identifier (RNTI) corresponding to the service.

For example, the broadcast channel may include at least one of (1) a control channel for broadcast and/or multicast or (2) a data channel for broadcast and/or multicast.

According to some embodiments of the present disclosure, the stored a plurality of instructions may cause the wireless device to transmit, to the network, an interest indication for the service to receive the service. For example, the service via unicast may be provided, from the network, after transmitting to the interest indication.

For example, the informing the network of the reception of the service via the multicast and/or the broadcast may comprise informing, by an AS layer of the wireless device, the network of the reception of the service via the multicast and/or the broadcast, regardless of whether receiving the service via unicast.

For example, the informing the network of the reception of the service via the multicast and/or the broadcast may comprise transmitting, to the network, an assistant information informing the successful reception of the service via the multicast and/or the broadcast, while receiving the service via unicast.

For example, the informing the network of the reception of the service via the multicast and/or the broadcast may comprise informing the network of an identity of the service.

For example, the informing the network of the reception of the service via the multicast and/or the broadcast may comprise informing the network that the service via unicast is no longer needed.

According to some embodiments of the present disclosure, the stored a plurality of instructions may cause the wireless device to be in communication with at least one of a user equipment, a network, or an autonomous vehicle other than the wireless device.

Hereinafter, a method performed by a base station (BS) for a quick switch between broadcast and unicast transmission in a wireless communication system, according to some embodiments of the present disclosure, will be described.

The BS may provide, to a wireless device, a service via both (1) unicast and (2) broadcast and/or multicast. The BS may receive, from a wireless device, an assistant information informing that the wireless device receives the service via the broadcast and/or the multicast. The BS may provide, to the wireless device, the service via only the broadcast and/or the multicast.

For example, the BS may stop to provide the service via the unicast, upon receiving the assistant information.

For example, the BS may receive, from the wireless device, an interest indication for the service and initiate to provide, to the wireless device, the service via the unicast upon receiving the interest indication.

Hereinafter, a base station (BS) for a quick switch between broadcast and unicast transmission in a wireless communication system, according to some embodiments of the present disclosure, will be described.

The BS may include a transceiver, a memory, and a processor operatively coupled to the transceiver and the memory.

The processor may be configured to control the transceiver to provide, to a wireless device, a service via both (1) unicast and (2) broadcast and/or multicast. The processor may be configured to control the transceiver to receive, from a wireless device, an assistant information informing that the wireless device receives the service via the broadcast and/or the multicast. The processor may be configured to control the transceiver to provide, to the wireless device, the service via only the broadcast and/or the multicast.

For example, the processor may be configured to stop to provide the service via the unicast, upon receiving the assistant information.

For example, the processor may be configured to control the transceiver to receive, from the wireless device, an interest indication for the service and initiate to provide, to the wireless device, the service via the unicast upon receiving the interest indication.

The present disclosure can have various advantageous effects.

According to some embodiments of the present disclosure, a wireless device could perform a quick switch between broadcast and unicast transmission efficiently, by informing a network of successful reception of a service via broadcast.

According to some embodiments of the present disclosure, a wireless communication system could efficiently provide a method for a quick switch between broadcast and unicast transmission, by using assistant information from a wireless device.

For example, when a transmission mode for a service is switched from the unicast to the broadcast, network could minimize the period of time that the network need to perform the unicast transmission in parallel with the broadcast for the service.

For example, the network could reduce the radio resource that gets wasted for the unicast transmission.

Figure 17:
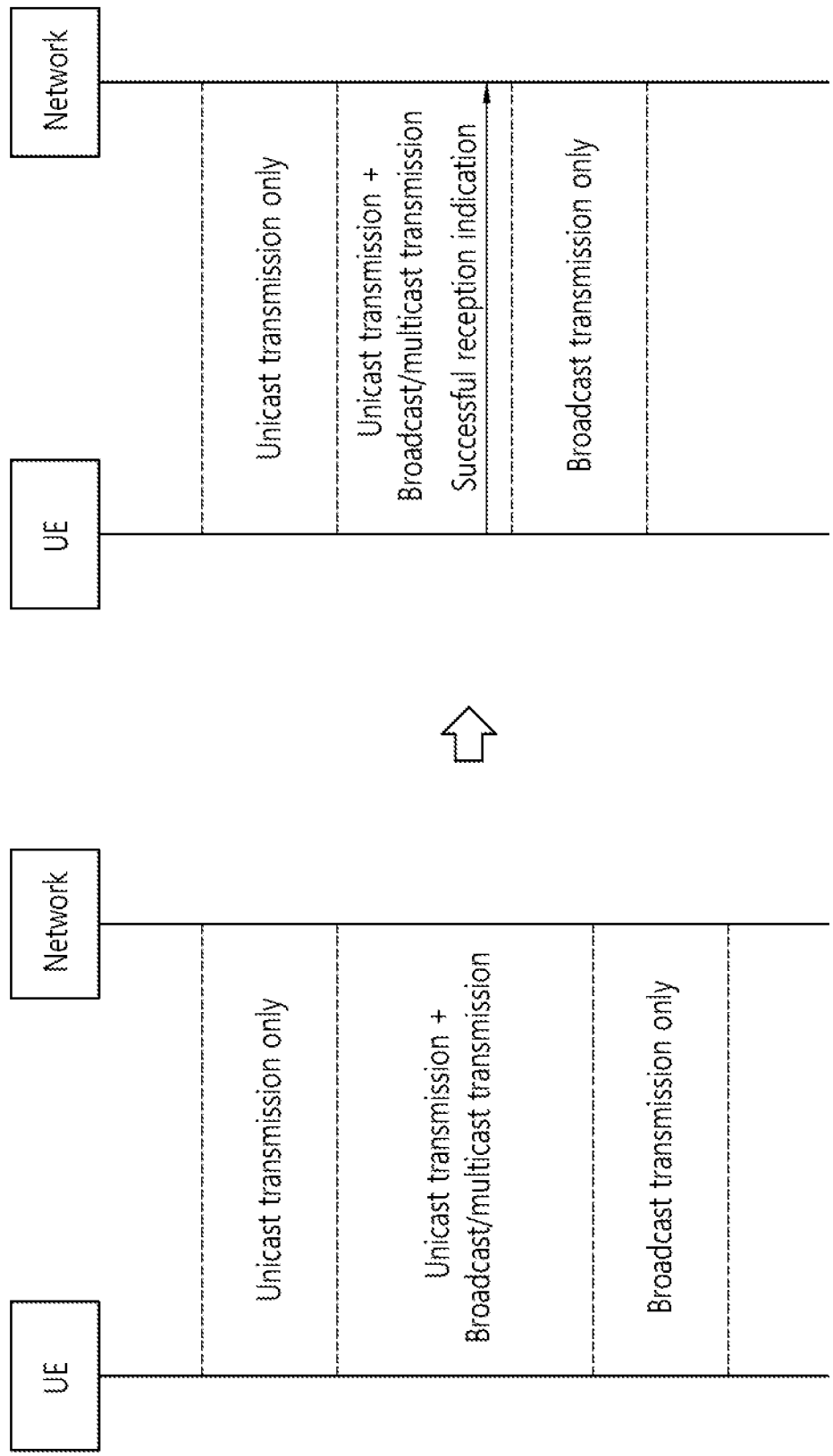
FIG. 17 shows a diagram for demonstrating an example of the advantageous effects, according to some embodiments of the present disclosure.

FIG. 17 shows a diagram for demonstrating an example of the advantageous effects, according to some embodiments of the present disclosure.

In FIG. 17, a network may provide a certain service to at least one wireless devices (for example, UE) via (1) unicast transmission only, (2) both unicast transmission and broadcast/multicast transmission, or (3) broadcast transmission only.

According to some embodiments of the present disclosure, when a certain wireless device successfully receives the service via broadcast/multicast transmission while receiving the service via unicast transmission, the wireless device may transmit a successful reception indication to the network.

When the network receives the successful reception indication from the certain wireless device, the network may (1) stop to provide the service via the unicast transmission, and (2) provide the service via broadcast/multicast transmission only.

The network may save the resource for providing the service to the certain wireless device via both the unicast transmission and broadcast/multicast transmission.

Therefore, the wireless communication system could save the radio resource for providing the service.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

Claims in the present disclosure can be combined in a various way. For instance, technical features in method claims of the present disclosure can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method. Other implementations are within the scope of the following claims.

What is claimed is:

1. A method, comprising,
receiving, by a wireless device from a network, a service via unicast;
detecting, by the wireless device, reception of the service via multicast and/or broadcast while receiving the service via unicast; and
transmitting, by the wireless device to the network, (i) an assistant information informing that the reception of the service via the multicast and/or the broadcast is successful and (ii) information related to a service identity corresponding to the service, while receiving the service via unicast.

2. The method of claim 1, wherein the service is a Multicast-Broadcast Services (MBS).

3. The method of claim 1, wherein the service is not provided via the unicast, after transmitting the assistant information informing that the reception of the service via the multicast and/or the broadcast is successful.

4. The method of claim 1, wherein the method further comprising,
monitoring, by the wireless device, whether the service is provided via broadcast and/or multicast or not, while receiving the service via unicast.

5. The method of claim 1, wherein the method further comprising,
considering, by the wireless device, that the service is successfully received via multicast and/or broadcast, based on that a Radio Resource Control (RRC) layer of the wireless device receives a notification for the service from a higher layer of the wireless device.

6. The method of claim 5, wherein the higher layer is an application layer or a Non-Access Stratum (NAS) layer, for the service.

7. The method of claim 1, wherein the method further comprising,
considering, by the wireless device, that the service is successfully received via multicast and/or broadcast, based on detecting a broadcast channel addressed by a Radio Network Temporary Identifier (RNTI) corresponding to the service.

8. The method of claim 7, wherein the broadcast channel includes at least one of (1) a control channel for broadcast and/or multicast or (2) a data channel for broadcast and/or multicast.

9. The method of claim 1, wherein the method further comprising,
transmitting, by the wireless device to the network, an interest indication for the service to receive the service, wherein the service via unicast is provided after transmitting to the interest indication.

10. The method of claim 1, wherein the method further comprising,
informing, by an AS layer of the wireless device, the network of the reception of the service via the multicast and/or the broadcast, regardless of whether receiving the service via unicast.

11. The method of claim 1, wherein the method further comprising,
informing, by the wireless device, the network that the service via unicast is no longer needed.

12. The method of claim 1, wherein the wireless device is in communication with at least one of a user equipment, a network, or an autonomous vehicle other than the wireless device.

13. A wireless device, comprising:
a transceiver;
a memory; and
at least one processor operatively coupled to the transceiver and the memory, and configured to:
control the transceiver to receive, from a network, a service via unicast;
detect reception of the service via multicast and/or broadcast while receiving the service via unicast; and
control the transceiver to transmit, to the network, (i) an assistant information informing that the reception of the service via the multicast and/or the broadcast is successful and (ii) information related to a service identity corresponding to the service, while receiving the service via unicast.

14. The wireless device of claim 13, wherein the service is a Multicast-Broadcast Services (MBS).

15. The wireless device of claim 13, wherein the service is not provided via the unicast, after transmitting the assistant information informing that the reception of the service via the multicast and/or the broadcast is successful.

16. The wireless device of claim 13, wherein the at least one processor is further configured to,
monitor whether the service is provided via broadcast and/or multicast or not, while receiving the service via unicast.

17. The wireless device of claim 13, wherein the at least one processor is further configured to,
consider that the service is successfully received via multicast and/or broadcast, based on that a Radio Resource Control (RRC) layer of the wireless device receives a notification for the service from a higher layer of the wireless device.

18. A non-transitory computer-readable medium having stored thereon a plurality of instructions, which, when executed by a processor of a wireless device, cause the wireless device to:
receive, from a network, a service via unicast;
detect reception of the service via multicast and/or broadcast while receiving the service via unicast; and
transmit, to the network, (i) an assistant information informing that the reception of the service via the multicast and/or the broadcast is successful and (ii) information related to a service identity corresponding to the service, while receiving the service via unicast.

* * * * *